(12) United States Patent
Uhrenholt

(10) Patent No.: US 12,737,832 B2
(45) Date of Patent: Sep. 15, 2026

(54) ALLOCATION OF REGIONS TO RENDERING PROCESSORS IN A GRAPHICS PROCESSOR

(71) Applicant: Arm Limited, Cambridge (GB)

(72) Inventor: Olof Henrik Uhrenholt, Lund (SE)

(73) Assignee: Arm Limited, Cambridge (GB)

( * ) Notice: Subject to any disclaimer, the term of this patent is extended or adjusted under 35 U.S.C. 154(b) by 76 days.

(21) Appl. No.: 18/785,254

(22) Filed: Jul. 26, 2024

(65) Prior Publication Data

US 2025/0037228 A1 Jan. 30, 2025

(30) Foreign Application Priority Data

Jul. 28, 2023 (GB) ..................................... 2311686

(51) Int. Cl.
*G06T 1/20* (2006.01)

(52) U.S. Cl.
CPC ..................................... *G06T 1/20* (2013.01)

(58) Field of Classification Search
CPC ... G06T 1/20; G06F 9/50; G06F 15/80; G06F 15/82
See application file for complete search history.

(56) References Cited

U.S. PATENT DOCUMENTS

| | | | | |
|---|---|---|---|---|
| 10,387,990 | B2 * | 8/2019 | Broadhurst | G09G 5/363 |
| 2016/0005195 | A1 * | 1/2016 | Sorgard | G06T 11/40 345/420 |
| 2020/0005423 | A1 * | 1/2020 | Bonfiglioli | G06T 17/10 |

FOREIGN PATENT DOCUMENTS

GB 2558885 A 7/2018

OTHER PUBLICATIONS

Combined Search and Examination Report under Sections 17 and 18(3) dated Feb. 2, 2024, GB Patent Application No. GB2311686.6, 6 pages.

* cited by examiner

*Primary Examiner* — Antonio A Caschera
(74) *Attorney, Agent, or Firm* — Pearl Cohen LLP

(57) ABSTRACT

When performing rendering in a tile-based graphics processor that comprises plural rendering processors, different regions of the render output are allocated to different ones of the rendering processors for processing. The processing of the render output is tracked to determine when a portion of the render output that is still to be allocated to the rendering processors for processing falls below a threshold, and when it is determined that a portion of the render output that is still to be allocated to the rendering processors for processing falls below the threshold, smaller regions of the render output are thereafter allocated to the rendering processors for processing.

17 Claims, 10 Drawing Sheets

FIG. 6

ALLOCATION OF REGIONS TO RENDERING PROCESSORS IN A GRAPHICS PROCESSOR

BACKGROUND

The technology described herein relates to data processing systems and, in particular, to the allocation of processing tasks to processing resources of a data processing system, such as the allocation of regions of a render output to be generated to rendering processors of a tile-based graphics processing system for processing.

Many data processing systems include a plurality of processing resources (e.g. processing cores) that may each process different processing tasks in parallel to one another. This allows a larger processing task (processing job) to be split into smaller processing tasks that are submitted to different ones of the processing resources for processing to complete the larger processing task (processing job).

The technology described herein will be described with particular reference to "tile-based" graphics processing by a graphics processor that has a plurality of rendering processors, although embodiments of the technology described herein are more broadly applicable to data processing systems that issue data processing tasks to be completed, e.g. to process a data array, to a plurality of processing resources in parallel.

In tile-based graphics processing, a (two dimensional) output array of a rendering process (the "render target"/"render output") (e.g., and typically, the frame/image that will be displayed to display the scene being rendered) is sub-divided (partitioned) into a plurality of smaller regions, usually referred to as "tiles", for the rendering process. The tiles are each rendered separately. The rendered tiles are then recombined to provide the complete output array (frame) (render target), e.g. for display.

The tiles can therefore be thought of as regions of the render target area (output frame) that the rendering process operates on. In such arrangements, the render target area (output frame) is typically divided into regularly sized and shaped tiles (they are usually, e.g., squares or rectangles) but this is not essential.

Other terms that are commonly used for "tiling" and "tile based" rendering include "chunking" (the sub-regions are referred to as "chunks") and "bucket" rendering. The terms "tile" and "tiling" will be used herein for convenience, but it should be understood that these terms are intended to encompass all alternative and equivalent terms and techniques.

In graphics processing systems that comprise a plurality of independent rendering processors (processing cores), different tiles of a render target may be processed (rendered) in parallel by different rendering processors, thereby potentially reducing the time taken to process (render) the render target. To control the rendering of different tiles by different rendering processors, the tiles may be allocated to particular respective rendering processors for processing and the rendering processors may successively render the tiles allocated to them until all of the required tiles of the render target have been rendered.

The Applicants believe that there remains scope for improvements to tile-based graphics processing systems.

BRIEF DESCRIPTION OF THE DRAWINGS

Embodiments of the technology described herein will now be described by way of example only and with reference to the accompanying drawings, in which:

FIG. 6 illustrates schematically a rendering task and sub-region indications for allocating a region to a rendering processor for processing in accordance with embodiments of the technology described herein.

DETAILED DESCRIPTION

Figure 1:
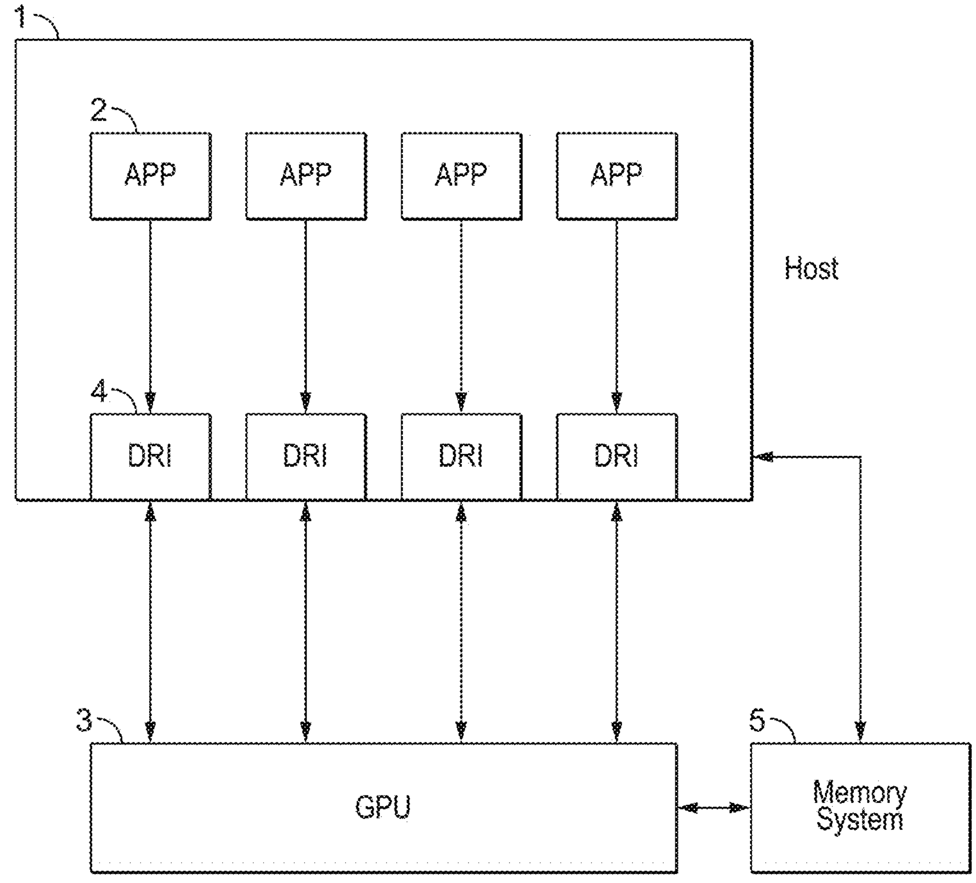
FIG. 1 illustrates schematically an exemplary computer graphics processing system.

A first embodiment of the technology described herein comprises a method of operating a tile-based graphics processor that comprises plural rendering processors each operable to render rendering tiles that a render output is divided into for rendering purposes, the method comprising:

when rendering a render output:

allocating different regions of the render output to different ones of the rendering processors for processing; and each rendering processor processing the region or regions allocated to it to generate rendered data for the region or regions;

the method further comprising:

tracking the processing of the render output to determine when a portion of the render output that is still to be allocated to the rendering processors for processing falls below a threshold; and when it is determined that a portion of the render output that is still to be allocated to the rendering processors for processing falls below the threshold:

thereafter allocating smaller regions of the render output to the rendering processors for processing.

A second embodiment of the technology described herein comprises a tile-based graphics processor, comprising:

a plurality of rendering processors, each operable to render rendering tiles that a render output is divided into for rendering purposes; and a region allocation circuit configured to allocate regions of a render output to be processed to rendering processors for processing;

wherein the rendering processors are configured to process regions of a render output allocated to them by the region allocation circuit to generate rendered data for the regions;

and wherein the region allocation circuit is configured to:

track the processing of a render output to determine when a portion of the render output that is still to be allocated to the rendering processors for processing falls below a threshold; and when it is determined that a portion of a render output that is still to be allocated to the rendering processors for processing falls below the threshold, thereafter allocate smaller regions of the render output to the rendering processors for processing.

The technology described herein relates to a tile-based graphics processor that includes plural rendering processors. When processing a render output, respective regions of the render output are allocated to respective ones of the rendering processors for processing.

Processing carried out by the rendering processors for respective regions of a render output (e.g. rasterisation and shading processes) can be used to collectively render the render output, such as for display.

In the technology described herein, the processing of a render output is tracked to determine when the portion of the render output that is still to be allocated to the rendering processors for processing falls below a threshold. When it is determined that the portion of the render output that is still to be allocated to the rendering processors for processing falls below the threshold, smaller regions of the render output are thereafter allocated to the rendering processors for processing.

As will be discussed further below, the Applicants have recognised that by reducing the size of regions that are allocated to the rendering processors for processing when the amount of the render output that is still to be allocated for processing falls below a threshold, the processing of a render output can be made more efficient.

In particular, the applicants have recognised that initially allocating larger regions of a render output to the rendering processors may be beneficial, for example in terms of the overhead for the allocation process (as there can then be fewer allocations of regions to the rendering processors for the render output compared to if smaller regions were allocated for the entire render output), but that towards the end of a render output there may be insufficient large regions still to be allocated to the rendering processors, such that some rendering processors may become idle while other processors process any remaining larger regions of the render output.

Reducing the size of regions that are allocated for processing once the remaining portion of a render output to be allocated falls below a threshold can allow the remaining portion of the render output to be distributed more evenly between the different available rendering processors compared to allocating larger regions for the entire render output.

In particular, this can more fully utilise the rendering processors for processing a render output until the processing of that render output has been completed. This can allow the processing of a render output to be completed by the rendering processors more efficiently (and therefore can allow a render output to be made available, e.g. for display, more quickly compared to if larger regions of the render output were allocated to rendering processors for processing for the entire render output).

Accordingly, in the technology described herein, a determination of whether the portion of the render output that is still to be allocated to the rendering processors for processing falls below a threshold is carried out, and smaller regions of a render output are allocated to the rendering processors for processing in response to it being determined that the portion of a render output that is still to be allocated to the rendering processors for processing is below a threshold.

These embodiments of the technology described herein relate to tile-based graphics processing i.e., in which a render output (such as, e.g., a frame to be displayed) is divided into plural rendering tiles for rendering purposes. Each rendering tile should, and in an embodiment does, comprise a (respective) region (area) of the render output.

The tiles that a render output is divided into for rendering purposes can be any suitable and desired such tiles. The size and shape of the rendering tiles may be dictated by the tile configuration that the graphics processor is configured to use and handle.

The rendering tiles are in an embodiment all the same size and shape (i.e. regularly sized and shaped tiles are in an embodiment used), although this is not essential. The tiles are in an embodiment rectangular, and in an embodiment square. The size and number of tiles can be selected as desired. Each tile may correspond to an array of contiguous sampling positions, for example each tile being 16×16 or 32×32 or 64×64 sampling positions in size. A render output may be divided into however many such tiles are required to span the render output, for the size and shape of the render output that is being used.

In the technology described herein, any suitable division of a render output into regions for allocation to the rendering processors for processing may be used.

However, in an embodiment, the division of a render output into regions for allocating to the rendering processors for processing is based on tiles that the render output is divided into for rendering purposes.

A region of a render output allocated to a rendering processor for processing may correspond to one tile, may correspond to an integer number of plural tiles (e.g. an array or line of contiguous plural tiles), or may correspond to a portion of a tile (a sub-tile) or portions (sub-tiles) of different tiles.

When a portion of a render output that is still to be allocated to rendering processors for processing is above a threshold, larger regions of a same (e.g. pre-determined) size as one another are in an embodiment allocated to the rendering processors for processing. The larger regions in an embodiment correspond to one or more tiles, and in an embodiment a predetermined number and arrangement of tile(s) is used. For example, larger regions allocated when the portion of the render output is above a threshold may each correspond to an array of (whole) tiles, such as 2×2 tiles. In an embodiment, each (larger) region corresponds to a single (entire) tile, such that regions of a render output are allocated to the rendering processors on a tile-by-tile basis when the portion of the render output that is still to be allocated to the rendering processors is above a threshold.

The smaller regions of a render output allocated once a portion of a render output that is still to be allocated to rendering processors for processing has fallen below a threshold are (also) in an embodiment of a same (e.g. predetermined) size as one another. In an embodiment, when a portion of a render output that is still to be allocated to the rendering processors for processing falls below a threshold, smaller regions are selected for allocation to the rendering processors by sub-dividing each outstanding (still to be allocated) larger region into smaller regions. Thus, each smaller region may correspond to a sub-region of a larger region. In an embodiment, there is a pre-determined number and/or arrangement of sub-regions that each larger region can be sub-divided into. For example, and in an embodiment, each outstanding (larger) region may be divided into four equal sized sub-regions for allocation purposes when the portion of the render output falls below the threshold.

The smaller regions in an embodiment each correspond to a portion of a rendering tile (a sub-tile region). Accordingly, when the portion of a render output that is still to be allocated to the rendering processors falls below a threshold, portions (sub-tile regions) of a tile (and in an embodiment for each tile still to be allocated) are in an embodiment allocated to the rendering processors for processing separately to one another.

Thus, according to an embodiment, allocating smaller regions of the render output to the rendering processors for processing comprises sub-dividing one or more of the tiles of the render output each into a plurality of sub-tile regions, and allocating the sub-tile regions to the rendering processors separately to each other for processing.

In an embodiment, regions of a render output are allocated to the rendering processors for processing by:

- (the region allocation circuit) initially allocating (entire) tiles of the render output to different ones of the rendering processors for processing; and
- when it is determined that the portion of the render output that is still to be allocated to the rendering processors for processing falls below a threshold:
  - thereafter sub-dividing any tile still to be allocated to a rendering processor into a plurality of sub-tile regions, and allocating the sub-tile regions to the rendering processors separately to each other for processing (and the rendering processors processing the sub-tile regions allocated to them to generate rendered data for the sub-tile regions).

Thus, the region allocation circuit is in an embodiment both operable to allocate a region to a rendering processor for processing that corresponds to one or more (entire) tiles and operable to allocate a region to a rendering processor for processing that corresponds to (only) a portion of a tile (a sub-tile).

The region allocation circuit may be operable to divide tiles into a fixed number of sub-tiles for allocation to the rendering processors or may be able to select different numbers/sizes of sub-tiles to divide tiles into for allocation to the rendering processors. For example, so as to allocate larger regions as larger sub-tiles and smaller regions as smaller sub-tiles.

The region allocation circuit may allocate a region of a render output to a rendering processor for processing by indicating to the rendering processor the region(s) that the rendering processor is allocated for processing in any suitable manner.

In an embodiment, the region allocation circuit can allocate a region to a rendering processor for processing by issuing a rendering task to the rendering processor, wherein the rendering task comprises a set of commands and/or data that the rendering processor can utilise to process the region that the rendering task corresponds to. The graphics processor can in an embodiment generate such a rendering task independent of when a rendering processor is available for processing the region that the rendering task corresponds to. A region can then be allocated to a rendering processor by issuing the rendering task corresponding to the region to a rendering processor as and when it is appropriate to do that.

In an embodiment, a rendering task is issued to a rendering processor for processing when the rendering processor has availability for processing the rendering task (e.g. once it has finished processing another rendering task). Having rendering tasks issued in response to availability of the rendering processors can allow for efficient division of the processing without prior knowledge of how long particular rendering tasks will take to process relative to other rendering tasks. However, in another embodiment, rendering tasks are issued to respective rendering processors in advance of when the rendering processors have availability for processing the rendering tasks, and a rendering processor can then process a rendering task that it has been issued as and when it has availability to do that. This may still provide a suitable division of the processing between rendering processors while allowing the allocation to happen in advance of when there is availability for the rendering tasks to be processed.

The order in which rendering tasks for a render output are issued to rendering processors for processing may be based on any suitable allocation order. For example, the order in which rendering tasks are issued may be based on the order in which the rendering tasks are generated, may be based on the positions of the regions that the rendering tasks correspond to within the render output, and/or may be based on some determination of an order in which it may be most efficient to process the rendering tasks in question.

The graphics processor in an embodiment comprises a rendering task generating circuit for generating rendering tasks and providing the rendering tasks to the region allocation circuit. A job controller of the graphics processor in an embodiment comprises the rendering task generating circuit. Thus, the graphics processor in an embodiment comprises a job controller that can generate a set of rendering tasks for a render output to be processed by the graphics processor, wherein different rendering tasks correspond to different regions of the render output. The region allocation circuit in an embodiment also forms part of the job controller.

The graphics processor is in an embodiment operable so that regions that a render output is divided into for allocation to the rendering processors need not directly correspond to regions of the render output that rendering tasks for the render output correspond to. In particular, the region allocation circuit in an embodiment can (when appropriate) allocate only part of a region (a sub-region) that a rendering task corresponds to a rendering processor for processing.

Thus, in an embodiment, regions of a render output are allocated to the rendering processors for processing by:

- (a rendering task generating circuit) generating a set of rendering tasks for processing the render output, wherein different rendering tasks in the set of rendering tasks correspond to different regions of the render output, and wherein the rendering processors are operable to process regions of the render output by processing the respective rendering tasks corresponding to the respective regions;
- (the region allocation circuit) allocating different regions of the render output to different ones of the rendering processors for processing by issuing different rendering tasks to different ones of the rendering processors for processing; and
- when it is determined that the portion of the render output that is still to be allocated to the rendering processors for processing falls below the threshold;
  - sub-dividing a region that a rendering task in the set of rendering tasks corresponds to and that is still to be allocated to a rendering processor for processing into a plurality of sub-regions, and allocating the sub-regions to the rendering processors separately to each other for processing.

The rendering processors are in an embodiment each controllable to process particular sub-region(s) of a region that a rendering task that the rendering processor is issued corresponds to. In an embodiment, this is achieved by the region allocation circuit being operable to issue a sub-region indication to a rendering processor together with a rendering task, and the rendering processor being configured to respond to a sub-region indication by processing the sub-region(s) indicated to be processed by the sub-region indication.

Thus, in an embodiment, a sub-region of a render output is allocated (by the region allocation circuit) to a rendering processor for processing by issuing to the rendering processor:

the rendering task that corresponds to the region that comprises the sub-region; and a sub-region indication indicating the sub-region within the region;

and the rendering processor processes said sub-region by controlling the processing it performs when processing the rendering task based on the sub-region indication.

When sub-regions for a region that a rendering task corresponds to are to be allocated separately to one another, the rendering task may be issued plural times with different sub-region indications.

In an embodiment, the region allocation circuit is configured to issue a sub-region indication for each rendering task issued to a rendering processor, wherein the sub-region indication controls which sub-region(s) of the region that the rendering task corresponds to the rendering processor will process in response to being issued the rendering task. When an entire region that a rendering task corresponds to is allocated to a rendering processor for processing, this can be indicated appropriately by the sub-region indication (and the rendering task need only be issued to a rendering processor once). This can allow a same data format to be used when issuing a rendering task to a rendering processor independent of whether it is the entire region or a sub-region that the rendering task corresponds to which is being allocated.

Accordingly, in an embodiment, the method comprises issuing a sub-region indication together with each rendering task issued to a rendering processor;

wherein, when the entire region that a rendering task corresponds to is allocated to a rendering processor for processing, the sub-region indication issued with that rendering tasks indicates that the rendering processor is allocated to process the entire region that the rendering task corresponds to when processing the rendering task.

The sub-region indications that are used in the technology described herein can take any suitable and desired form. For example, they could be in the form of a bit mask having an entry for each different sub-region, or indicate one of a set of plural values, with each value indicating a respective sub-region.

Although in the technology described herein the size of regions that are allocated to rendering processors for processing is controlled based on the tracking of the processing of the render output, the size of allocated regions need not directly correspond to the size of regions that rendering tasks correspond to, and rendering tasks for processing a render output can be, and in an embodiment are, generated independent of this tracking.

In an embodiment, rendering tasks for a render output are generated that each correspond to a region of the render output of the same size as one another, and in an embodiment corresponding to a same number of tile(s) as one another.

In an embodiment, the larger regions of the render output that are allocated when a portion of the render output that is still to be allocated to the rendering processors is above a threshold each correspond to a single entire rendering task. These larger regions can then each be allocated to a respective rendering processor by issuing the (single) rendering task that corresponds to the larger region to a rendering processor for processing. This can reduce the number of rendering tasks that need to be generated (and issued) compared to if the rendering tasks were to each correspond to a smaller region.

As discussed above, in the technology described herein, the size of regions that are allocated to rendering processors for processing is controlled based on whether the portion of a render output that is still to be allocated to the rendering processors for processing is below a threshold.

The threshold may be based on, and determined and assessed in relation to, any suitable measure of the size of the portion of a render output that is still to be allocated to the rendering processors for processing. This may, for example, be in terms of render output regions, rendering tiles, rendering tasks, or some other measure such as a number of (graphics) primitives.

In an embodiment, the threshold is based on the number of rendering processors (that can process respective regions of a render output in parallel). For example, a threshold number of regions (or rendering tiles or rendering tasks) for the render output could be set equal to the number of rendering processors (that can process respective regions in parallel), such that when the number of regions (or rendering tiles or rendering tasks) remaining to be allocated is equal to or falls below the number of rendering processors, then smaller regions are allocated to the rendering processors for processing.

Correspondingly, the processing of a render output can be tracked in any suitable manner to determine when the portion of the render output that is still to be allocated to the rendering processors for processing falls below a threshold.

For example, the processing of the render output could be tracked by tracking how much processing of the render output has already been allocated/performed and/or by tracking how much processing of the render output is still to be allocated/performed. The "amount" of processing that has been/that is still to be allocated may be, and in an embodiment is, "measured" appropriately for the threshold that is being used.

In an embodiment it is the allocation itself that is tracked to determine when the portion of the render output that is still to be allocated to the rendering processors for processing falls below a threshold.

Thus, in one embodiment, the size of the portion of a render output that is still to be allocated to the rendering processors for processing is determined by determining (tracking) the size of the portion of the render output that has been allocated to the rendering processors for processing (e.g. in terms of regions, tiles, rendering tasks or primitives) and, in an embodiment, comparing the size of the portion of the render output that has been allocated to the rendering processors to a total size of the render output (e.g. in terms of regions, tiles, rendering tasks or primitives, as appropriate).

In this case, it is in an embodiment determined that the portion of the render output that is still to be allocated to the rendering processors for processing is below the threshold in response to it being determined that the portion of the render output that has been allocated to the rendering processors for processing exceeds a particular size (which may be set based on a total size of the render output).

In an embodiment, the tracking of the processing of the render output in relation to the threshold is based on (and uses) a number of rendering tasks and/or a number of rendering tiles for the render output that are still to be allocated to a rendering processor for processing.

Thus, in an embodiment, tracking the processing of the render output to determine when a portion of the render output that is still to be allocated to the rendering processors for processing falls below a threshold comprises:

tracking when the number of tiles of the render output that are still to be allocated to the rendering processors for processing falls below a threshold number of tiles.

In another embodiment, tracking the processing of the render output to determine when a portion of the render output that is still to be allocated to the rendering processors for processing falls below a threshold comprises:

tracking the issuing of the rendering tasks to the rendering processors to determine when the number of rendering tasks that are in the set of rendering tasks for the render output and that are still to be allocated to the rendering processors for processing falls below a threshold number of rendering tasks.

As discussed above, the threshold (and tracking of the processing) may additionally or alternatively be based on other measures of the size of the portion of the render output that is still to be allocated to the rendering processors for processing. For example, the threshold may be based on (and the processing tracked based on) how many primitives there are for the portion of the render output that are still to be allocated to the rendering processors for processing (e.g. as a proportion of the number of primitives for the (entire) render output).

In an embodiment, the region allocation circuit counts the number of rendering tasks (or tiles) for a render output that it allocates to the rendering processors for processing, and compares the number of rendering tasks (or tiles) that have been allocated to the rendering processors to the total number of rendering tasks (or tiles) for the render output, to thereby determine the number of rendering tasks (or tiles) that are still to be allocated for the render output. This determination can be carried out any suitable number of times as a render output is processed, for example the comparison may be performed periodically or each time a region of a render output is to be allocated to a rendering processor.

As discussed above, the region allocation circuit may be operable to issue the same rendering task plural times (with different sub-region indications). When this occurs, the rendering task can be counted as allocated or not according to any suitable condition for the purpose of the tracking of the processing of the render output, such as the rendering task being counted as allocated when it is issued for a first time, or being counted as allocated when it issued for a final time. However, in an embodiment, rendering tasks are each issued a single time at least until the size of the portion of a render output that is still to be allocated to the rendering processors for processing falls below the threshold, such that plural issuing of rendering tasks need not be accounted for when determining whether the portion of the render output that is still to be allocated to the rendering processors is below the threshold.

There may be a single threshold that is used or plural successive thresholds may be used, where the size of regions that are allocated is decreased each time the portion of the render output that is still to be allocated to the rendering processors for processing falls below a (respective) threshold.

Thus, in an embodiment, the method may comprise (the region allocation circuit) decreasing the size of regions of the render output that are allocated to the rendering processors for processing each time the portion of the render output that is still to be allocated to the rendering processors for processing falls below one of plural successive thresholds.

Any number of thresholds may be used as appropriate for increasing processing efficiency. For example, there may be from 1 to 5 thresholds used.

In an embodiment, regions of a first size are initially allocated to respective rendering processors for processing and the processing of the render output is tracked to determine when the portion of the render output that is still to be allocated to the rendering processors falls below a first threshold. When it is determined that the portion of the render output that is still to be allocated to the rendering processors falls below the first threshold, regions of a second size that is smaller than the first size are allocated to respective rendering processors for processing. The processing of the render output is further tracked to determine when the portion of the render output that is still to be allocated to the rendering processors falls below a second threshold (that corresponds to there being a smaller portion of the render output that is still to be allocated to the rendering processors than the first threshold corresponds to). When it is determined that the portion of the render output that is still to be allocated to the rendering processors for processing falls below the second threshold, regions of a third size that is smaller than the second size are allocated to respective rendering processors for processing. For example, the first sized regions may each correspond to plural tiles, the second sized regions may each correspond to a single tile, and the third sized regions may each correspond to (only) a portion of a tile (a sub-tile).

While the allocation of a region of a render output to a rendering processor for processing will determine which rendering processor will process that region (by processing the tile(s) or parts thereof of the render output that the region corresponds to), a rendering processor is in an embodiment operable so that a region it is allocated for processing may still (when appropriate) be divided into smaller sub-regions for processing by the rendering processor, in an embodiment based on the tile(s) that the allocated region corresponds to.

Thus, in an embodiment, when a region corresponding to more than one tile is allocated to a rendering processor for processing, the rendering processor divides the processing it performs to process the region based on the tiles that the region corresponds to. In an embodiment, when a rendering processor is allocated a region of a render output for processing, the rendering processor will identify each tile that the region corresponds to, and is in an embodiment configured to determine, for each tile that the region corresponds to, whether it is the entire tile or only part of the tile (a sub-tile) that the region allocated to the rendering processor corresponds to. The rendering processor can then process the region by processing each tile (or sub-tile) that the region corresponds to. For example, the rendering processor may process each tile (or sub-tile thereof) that a region corresponds to one after another, or may process different tiles in parallel with one another (e.g. by different sets of resources of the rendering processor processing different tiles or sub-tiles).

A (and each) rendering processor can process (the tiles or sub-tiles of) the regions and sub-regions it is allocated in any suitable and desired manner, and subject to any operation required for the purposes of the technology described herein, in an embodiment does this in the normal manner for the graphics processor and graphics processing system in question.

Thus in an embodiment, a tile of a render output is processed by determining primitives to be processed for the tile and rasterising primitives for the tile to generate graphics fragments for shading (and then shading (rendering) the graphics fragments). The rendering processors accordingly in an embodiment comprise a rasterisation stage (rasterisation circuit) that operates to and is configured to rasterise primitives into graphics fragments for processing, and a fragment processing (shading) stage that processes the graphics fragments.

The primitives that need to be processed for a tile are, in an embodiment, determined (identified) based on primitive lists that primitives for the render output are sorted into and that are indicative of which primitives should be rendered for respective regions of the render output being generated that the primitive lists relate to.

The graphics processor accordingly, in an embodiment, comprises an appropriate tiler (tiling unit/circuit/stage) that sorts primitives into respective primitive lists. Primitive lists corresponding to individual rendering tiles may be prepared, and/or primitive lists corresponding to sets of plural rendering tiles may be prepared.

Once the tiling stage (tiling circuit) has completed the preparation of the primitive lists, then each tile can be processed (rasterised and rendered).

The rasterisation stage (rasterisation circuit) in an embodiment determines what sampling positions of the render output fall within a primitive (are covered by the primitive), and generates graphics fragments having appropriate positions (representing appropriate sampling positions) for rendering the primitive accordingly. Each graphics fragment may correspond to a single sampling position, or a set of plural sampling positions (e.g. 2×2 sampling positions), as desired.

The rendering stage (rendering circuit) should, and in an embodiment does, render fragments generated by the rasterisation stage/rasterisation circuit to generate rendered (fragment) data.

The rendering process performed by the rendering stage (rendering circuit) may comprise one or more fixed function rendering stages, such as texture mappers, blenders, fogging units, etc.

In an embodiment, the rendering process performs one or more fragment shading operations on a fragment to derive rendered data, such as colour values (e.g. red, green and blue (RGB) colour values) and an "alpha" (transparency) value, for shading each covered sampling position in the render output that that the fragment corresponds to. The fragment shading operations may involve any suitable processes for shading fragments, such as executing one or more fragment shading programs on the fragments, applying textures to the fragments, etc.

Thus, in an embodiment the rendering stage (rendering circuit) comprises a fragment shader (a shader pipeline) (i.e. a programmable pipeline stage that is operable to and can be programmed to carry out fragment shading programs on fragments in order to render them). The rendering process may also or instead include (performing) ray-tracing, if desired.

When an entire tile is to be processed by a rendering processor, the rendering processor can process the tile in the "normal" manner. However, when a region that is only part but not all of a tile (that is a sub-tile of a tile) is to be processed, the operation of the rendering processor is in an embodiment configured and adjusted to account for that. This can be done in any suitable and desired manner.

In an embodiment, when a sub-tile of a tile is to be processed by a rendering processor, the rendering processor in an embodiment operates to determine the primitives to be processed for the sub-tile, and to provide (only) the primitives to be processed for the sub-tile to the rasterisation stage (rasterisation circuit) (rather than necessarily providing all of the primitives to be processed for the entire tile).

Thus, in an embodiment, when a sub-tile region of a tile is allocated to a rendering processor for processing, the rendering processor:
- determines a set of primitives for the tile;
- determines whether primitives in the set of primitives for the tile fall within the sub-tile region;
- generates graphics fragments for the sub-tile region by rasterising primitives determined to fall within the sub-tile region; and processes the graphics fragments generated for the sub-tile region to generate rendered data for the sub-tile region.

The primitives for the tile may be determined by a primitive list reader of the rendering processor reading a primitive list or lists for the tile or by any other suitable means. However, even when employed for determining the primitives for a tile, the primitive list reader is in an embodiment not required to differentiate which primitives relate to a sub-tile using the primitive lists. This can avoid the need for primitive lists to be prepared for regions smaller than individual tiles.

In an embodiment, the primitives to be processed for a sub-tile of a tile are determined based on edge information representing edges of primitives and information representing the boundaries of the sub-tile in question. When regions are allocated by issuing rendering tasks, the boundaries of a sub-tile to be processed are in an embodiment determined from the rendering task and, if provided, a sub-region indication for the rendering task.

Accordingly, in an embodiment, the primitives to be processed for a sub-tile of a tile are determined by determining which primitives for the tile may fall within the boundaries of the sub-tile using the edge information for (e.g. all) primitives for the tile and information representing the boundaries of the sub-tile.

The information representing the boundaries of a sub-tile is in an embodiment in effect used as (and used to set) a "scissor box" that will control which primitives to be processed for the (entire) tile are to be processed for the sub-tile in question. Primitives that are not to be processed for the sub-tile are in an embodiment culled (based on the scissor box) when processing the sub-tile to prevent the primitives that are not to be processed for the sub-tile from being provided to the rasterisation stage (rasterisation circuit) to process the sub-tile.

Thus, a rendering processor allocated a region to process that comprises (only) a sub-tile of a tile in an embodiment comprises a culling unit that can, inter alia, determine the primitives to be processed for the sub-tile (e.g. from the primitives provided by the primitive list reader to be processed for the tile) and provide the primitives to be processed for the sub-tile to the rasterisation stage (rasterisation circuit) for rasterisation.

In an embodiment, the writing of the rendered fragment data to and from the tile buffer is also or instead (and in an embodiment also) modified when processing a region that is smaller than a tile (a sub-tile).

(In this regard, the rendering processors should and in an embodiment do (each) comprise a tile buffer for storing rendered fragment data, such as colour and depth values associated with (the sampling positions of) fragments. Rendered data is then written out of the tile buffer to, for example, a frame buffer or "main" memory when appropriate to do so (e.g. once all of the rendered data for the tile (ort part thereof) has been generated).)

When rendered data for (only) a sub-tile is required to be generated to render a region (or sub-region) allocated to a rendering processor, the graphics processor is in an embodiment operable so that the rendered data for that sub-tile can be written into and out of the tile buffer without requiring data for the entire tile to be written into and out of the tile buffer.

Rendered data for the sub-tile can be generated and written into the tile buffer by, for example, selectively rasterising only the primitives for the tile that fall within the sub-tile in the manner discussed above. To selectively write out the rendered data for a sub-tile, the graphics processor is in an embodiment operable to determine which data positions within the tile buffer correspond to positions in the render output that fall within the region or sub-region being processed by the relevant rendering processor, and to select which data positions to write out based on the determination.

Thus, in an embodiment, the graphics processor is operable to generate rendered data for a sub-tile and to store the rendered data in a tile buffer, and to write out the rendered data for the sub-tile from the tile buffer by:

- determining which data positions within the tile buffer relate to the sub-tile; and
- writing out rendered data for the data positions of the tile buffer that are determined to relate to the sub-tile.

The graphics processor may determine which data positions within the tile buffer relate to a sub-tile in any suitable manner. However, this is in an embodiment based on whether the data position in the tile buffer corresponds to a position in the render output that falls within the sub-tile. When a sub-tile is rendered in response to it being determined that the region or sub-region allocated to a rendering processor comprises that sub-tile (rather than comprising the entire corresponding tile), determining whether a position in the render output falls within the sub-tile may be determined by determining whether the position falls within the region or sub-region allocated to the rendering processor.

The above describes the particular elements of the graphics processor that are involved in the operation in the manner of the technology described herein. As will be appreciated by those skilled in the art, the graphics processor can otherwise include, and in an embodiment does include, and execute, any one or one or more, and in an embodiment all, of the other processing circuits/stages that graphics processors may (normally) include.

Thus, for example, the graphics processor, in an embodiment, also includes one or more of, and in an embodiment plural of, and in an embodiment all of: one or more shader stages/circuits (such as a vertex shader or shaders); one or more (early and/or late) culling (e.g. depth and/or stencil) testers (culling (e.g. depth and/or stencil) test stages), a blender (blending stage), etc.

The writing out of the rendered data from the tile buffer to the output buffer (in memory) may also comprise, for example, downsampling and/or compressing the data from the tile buffer as it is written out.

Other arrangements for the graphics processing that is being executed would, of course, be possible.

The render output to be generated may comprise any render output that can be and is to be generated by a graphics processor and processing pipeline, such as a frame for display, a render-to-texture output, etc. In an embodiment, the render output is an output frame, and in an embodiment an image.

In an embodiment, the various functions of the technology described herein are carried out on a single graphics processing platform that generates and outputs the (rendered) data that is, e.g., written to a frame buffer for a display device.

The graphics processor may also be in communication with a host microprocessor, and/or with a display for displaying images based on the output of the graphics processor.

Although the embodiments of the technology described herein described above relate to tile-based graphics processing, it is believed that allocating different regions of a data array to different processing circuits for processing in the manner described above for processing a render output may be novel and inventive in its own right.

Thus, a third embodiment of the technology described herein comprises a method of operating a data processor that comprises plural processing circuits each operable to process regions that a data array is divided into for processing purposes, the method comprising:

- when processing a data array:
  - allocating different regions of the data array to different ones of the processing circuits for processing; and
  - each processing circuit processing the region or regions allocated to it; the method further comprising:
- tracking the processing of the data array to determine when a portion of the data array that is still to be allocated to the processing circuits falls below a threshold; and
- when it is determined that a portion of the data array that is still to be allocated to the processing circuits falls below the threshold:
  - thereafter allocating smaller regions of the data array to the processing circuits for processing.

According to fourth embodiment of the technology described herein comprises a data processor, comprising:

- a plurality of processing circuits, each operable to process regions that a data array is divided into for processing purposes; and
- a region allocation circuit configured to allocate regions of a data array to be processed to processing circuits for processing;
- wherein the processing circuits are configured to process regions of a data array allocated to them by the region allocation circuit;
- and wherein the region allocation circuit is configured to:
  - track the processing of the data array to determine when a portion of the data array that is still to be allocated to the processing circuits for processing falls below a threshold; and
  - when it is determined that a portion of a data array that is still to be allocated to the processing circuits for processing falls below the threshold, thereafter allocate smaller regions of the data array to the processing circuits for processing.

The third and fourth embodiments of the technology described herein may comprise any of the optional features described above in relation to the first and second embodiments, as appropriate.

For example, the smaller regions of the data array may be provided by sub-dividing larger regions of an initially prepared set of regions of the data array for allocating to the processing circuits.

In an embodiment, the method comprises (a processing task generating circuit of the data processor) generating a set of processing tasks for processing the data array, wherein different processing tasks in the set of processing tasks correspond to different regions of the data array, and wherein the processing circuits are operable to process regions of the data array by processing the respective processing tasks corresponding to the respective regions;

(the region allocation circuit) allocating different regions of the data array to different ones of the processing circuits for processing by issuing different processing tasks to different ones of the rendering processors for processing; and when it is determined that the portion of the data array that is still to be allocated to the processing circuits for processing falls below the threshold;

sub-dividing a region that a processing task in the set of processing tasks corresponds to and that is still to be allocated to a processing circuit for processing into a plurality of sub-regions, and allocating the sub-regions to the processing circuits separately to each other for processing.

A sub-region is, in an embodiment, allocated to a processing circuit for processing by issuing to the processing circuit:

the processing task that corresponds to the region that comprises the sub-region; and a sub-region indication indicating the sub-region within the region;

and the processing circuit in an embodiment processes said sub-region by controlling the processing it performs when processing the processing task based on the sub-region indication.

In an embodiment, the region allocation circuit is configured to issue a sub-region indication together with each processing task issued to a processing circuit;

wherein the region allocation circuit is configured to allocate an entire region that a processing task corresponds to a processing circuit for processing by issuing the processing task and a the sub-region indication that indicates that the processing circuit is allocated to process the entire region that the processing task corresponds to when processing the processing task.

When a sub-region is allocated to a processing circuit for processing, the processing circuit in an embodiment controls the processing it performs to process the sub-region so as to process the sub-region without performing all of the processing that would be required for processing the (entire) region that comprises the sub-region.

The data processor in an embodiment comprises respective data buffers for respective ones of the processing circuits, wherein the processing circuits are each configured to store processed data for a region of the data array in a respective data buffer for the processing circuit. When a sub-region is processed by a processing circuit, the processing circuit in an embodiment configured to determine which data positions in the data buffer store processed data for sub-region, and to write out the processed data for the sub-region from the data positions determined to store processed data for the sub-region (without writing out data from all of the data positions of the data buffer).

In an embodiment, the region allocation circuit decreases the size of regions of the data array that are allocated to the processing circuits for processing each time the portion of the data array that is still to be allocated to the processing circuits for processing falls below one of plural successive thresholds.

The technology described herein can be implemented in any suitable system, such as a suitably configured micro-processor based system. In some embodiments, the technology described herein is implemented in computer and/or micro-processor based system.

In embodiments, the graphics processor or data processor comprises, and/or is in communication with, one or more memories and/or memory devices that store the data described herein, and/or that store software for performing the processes described herein.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry/circuits, etc., if desired.

Furthermore, unless otherwise indicated, any one or more or all of the processing stages of the technology described herein may be embodied as processing stage circuits, e.g., in the form of one or more fixed-function units (hardware) (processing circuits), and/or in the form of programmable processing circuits that can be programmed to perform the desired operation. Equally, any one or more of the processing stages and processing stage circuits of the technology described herein may be provided as a separate circuit element to any one or more of the other processing stages or processing stage circuits, and/or any one or more or all of the processing stages and processing stage circuits may be at least partially formed of shared processing circuits.

Subject to any hardware necessary to carry out the specific functions discussed above, the graphics and/or data processor can otherwise include any one or more or all of the usual functional units, etc., that graphics and/or data processors include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

The present embodiments relate to computer graphics processing.

FIG. 1 shows a typical computer graphics processing system.

An application 2, such as a game, executing on a host processor (CPU) 1 will require graphics processing operations to be performed by an associated graphics processor (graphics processing unit (GPU)) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

The present embodiments relate to tile-based graphics processing in which tiles that a render output is divided into for rendering purposes can be processed by a rendering processor executing a graphics processing pipeline to process and output a tile (or part thereof) separate from the processing or outputting of other tiles (or parts thereof).

Figure 2:
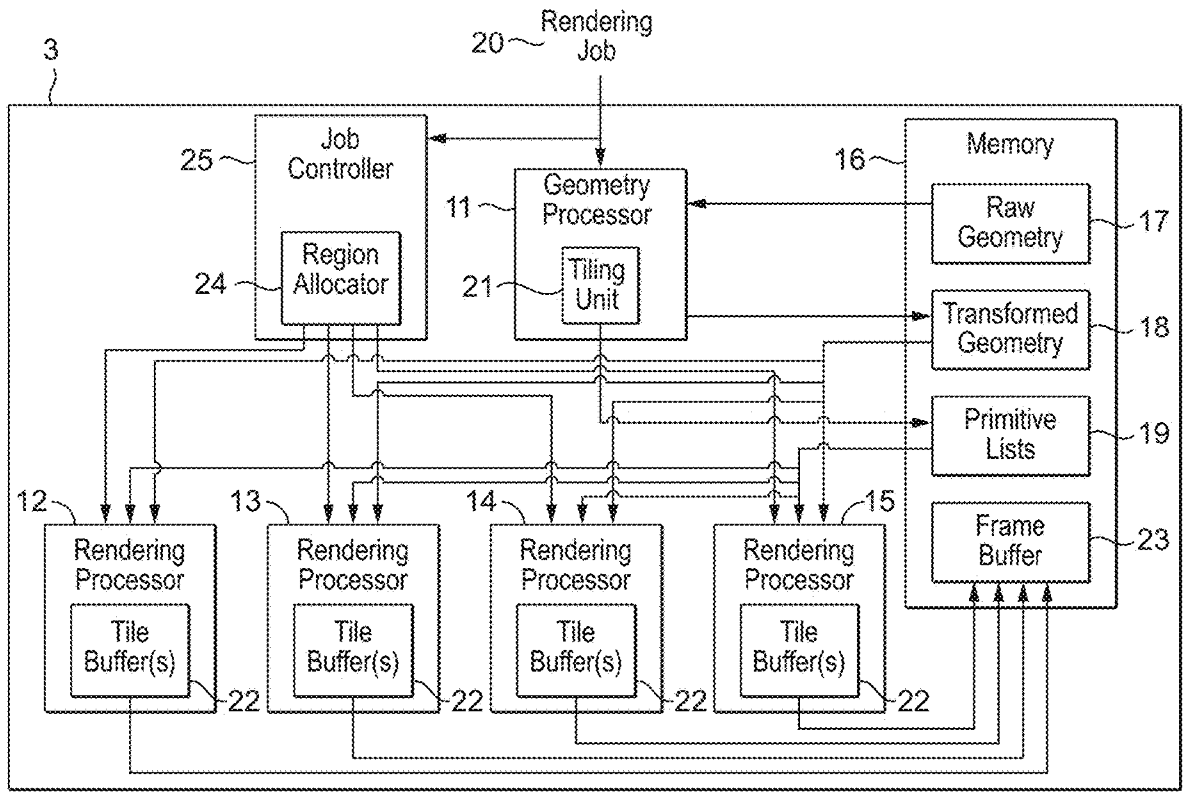
FIG. 2 illustrates schematically a graphics processor that is in accordance with embodiments of the technology described herein.

FIG. 2 shows schematically the graphics processor 3 in the embodiments. The graphics processor 3 is a tile-based graphics processor and includes a geometry processor 11 and plural rendering processors (renderers/shader cores) 12, 13, 14, 15, all of which can access memory 16 of the memory system 5. The memory 16 may be local to (e.g. "on-chip" with) the geometry processor 11 and renderers 12, 13, 14 and 15, or may be an external memory (e.g. "main" memory) that can be accessed by the geometry processor 11 and the rendering processors 12, 13, 14 and 15.

FIG. 2 shows a graphics processor 3 with four rendering processors, but other configurations of plural rendering processors can be used if desired.

The memory 16 stores, inter alia, and as shown in FIG. 2, a set of raw geometry data 17 (which is, for example, provided by a graphics processor driver 4 or an API 2 running on the host system (microprocessor) 1 for the graphics processor 3), a set of transformed geometry data 18 (which is the result of various transformation and processing operations carried out on the raw geometry 17), and a set of primitive lists 19.

The primitive lists 19 may each correspond to respective tile(s) that the render output, such as a frame to be displayed, to be generated by the graphics processor 3 is divided into for rendering purposes, and contain data, commands, etc., for the respective primitives that are to be processed for the respective tile(s) that the list corresponds to.

The transformed geometry data 18 comprises, for example, transformed vertices (vertex data), etc.

The geometry processor 11 takes as its input the raw geometry data 17 stored in the memory 16 in response to the graphics processor 3 receiving commands to execute a rendering job 20 from, e.g., a graphics processor driver 4, and processes that data to provide transformed geometry data 18 (which it then stores in the memory 16) comprising the geometry data in a form that is ready for placement in the render output (e.g. frame to be displayed).

The geometry processor 11 and the processes it carries out can take any suitable form and be any suitable and desired such processes. The geometry processor 11 may, e.g., include a programmable vertex shader that executes vertex shading operations to generate the desired transformed geometry data 18.

As shown in FIG. 2, the geometry processor 11 also includes a tiling unit 21. This tiling unit 21 carries out the process of allocating the primitives to the primitive lists which are then used to identify the primitives that should be rendered for each tile that is to be rendered to generate the render output (which in this embodiment is a frame to be rendered for display). To do this, the tiling unit 21 takes as its input the transformed and processed vertex data 18 (i.e. the positions of the primitives in the render output), builds primitive lists using that data, and stores those primitive lists as the primitive lists 19 in the memory 16.

To prepare the primitive lists, the tiling unit 21 takes each transformed primitive in turn, determines the location for that primitive, compares the primitive's location with the locations of (the render output areas covered by) the respective regions for which primitive lists are to be prepared, and then includes the primitive in the respective primitive lists 19 for the regions that the primitive in question is determined as potentially falling within (intersecting). This may be carried out with, for example, a bounding box binning technique, or with an exact binning technique.

In the present embodiment, sets of regions for which primitive lists are prepared are arranged in a hierarchy of sets of regions, wherein each set of regions corresponds to a layer in the hierarchy of sets of regions, and wherein regions for which primitive lists are prepared in progressively higher layers of the hierarchy are progressively larger. Each region for which a primitive list can be prepared in a lowest layer of the hierarchy corresponds to a single tile of the render output. Other configurations for the primitive lists would, however, be possible.

In the present embodiment, to process a tile or part thereof, a rendering processor takes the transformed primitives read from the primitive lists applying to the tile and rasterises and renders those primitives to, as appropriate, generate rendered graphics data in the form of output fragment (sampling point) data for each respective sampling position within the tile or part thereof that it is processing. To this end, each rendering processor includes a respective rasterising unit, rendering unit and set of one or more tile buffers 22 that store the rendered data generated by the rendering processor. Once a rendering processor has completed its processing of a given tile or part thereof, the stored, rendered data for that tile or part thereof is output from the tile buffer(s) 22 to the output render target, which in this embodiment is a frame buffer 23 for a display.

As discussed above, the present embodiments relate to a tile-based graphics processor 3 comprising plural rendering processors 12, 13, 14 and 15 in which a render output (e.g. frame to be rendered) is rendered as plural individual rendering regions that each correspond to one or more tiles or parts thereof. Thus, a respective rendering processor can render a region of the render output that it has been allocated by rendering tile(s) or parts thereof corresponding to the allocated region, and, when the rendering processor has processed a tile or part thereof within a region it is processing, write the rendered data for that tile or part thereof to the frame buffer 23. When one tile or part thereof within a region allocated to a rendering processor has been processed, another tile or part thereof (when present) within the region may be processed by the rendering processor and the rendered data for that tile or part thereof written to the frame buffer 23. When a rendering processor has finished processing one region, another region of the render output that is yet to be processed can be allocated to the rendering processor for processing. In this manner, each tile will be processed and output separately from other tiles but a respective tile may itself be output together or as separate parts (sub-tiles).

Thus, respective regions of a render output are allocated as rendering tasks to the respective rendering processors 12, 13, 14 and 15 for processing. This operation is performed by a region allocator (region allocation circuit) 24.

In the present embodiment, the region allocator is part of a job controller 25 of the graphics processor 3. The job controller 25 will, inter alia, issue commands and data to the region allocator 24 for the region allocator 24 to then schedule appropriate rendering tasks for and onto the graphics processing pipeline 100 of a rendering processor. The generation of a render output by execution of a rendering job 20 is carried out by the processing of the rendering tasks. Thus, the region allocator 24 operates to allocate rendering tasks to the rendering processors 12, 13, 14 and 15 for processing for a rendering job 20 that is to be performed by the graphics processor 3.

When a rendering processor 12, 13, 14, 15 is allocated a rendering task that corresponds to a region to be processed for a render output, the rendering processor processes that region by executing a graphics processing pipeline for the tile(s) or parts thereof that the region corresponds to. This operation of a rendering processor will now be described in more detail.

Figure 3:
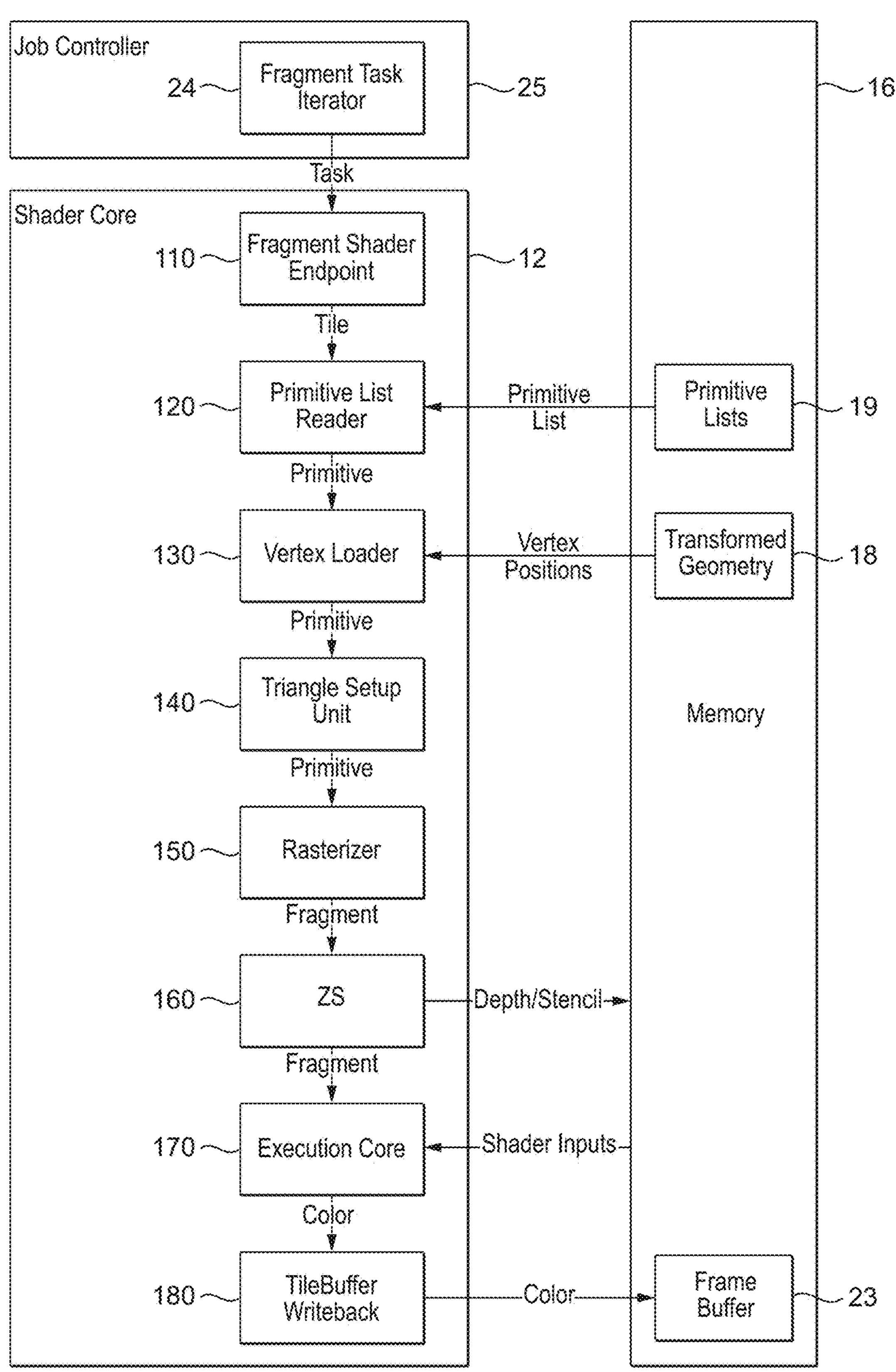
FIG. 3 illustrates schematically a graphics processing pipeline executed by the graphics processor in accordance with embodiments of the technology described herein.

FIG. 3 shows an exemplary graphics processing pipeline 100 that is executed by a rendering processor (shader core) 12 of the graphics processor in the present embodiments. Each of the other rendering processors 13, 14, 15 also executes a graphics processing pipeline in the same manner.

FIG. 3 shows the main elements and pipeline stages of the graphics processing pipeline 100 according to the present embodiments. As will be appreciated by those skilled in the art, there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. Equally, some of the elements depicted in FIG. 3 need not be provided, and FIG. 3 merely shows one example of a graphics processing pipeline 100. It will also be appreciated that each of the stages, elements and units, etc., of the graphics processing pipeline as shown in FIG. 3 may be implemented as desired and will accordingly comprise, e.g., appropriate circuits and/or processing logic, etc., for performing the necessary operation and functions.

The graphics processing pipeline as illustrated in FIG. 3 will be executed on and implemented by a (and each) rendering processor (shader core) 12 of the graphics processor (graphics processing unit (GPU)) 3, which will accordingly include the necessary functional units, processing circuits, etc., operable to execute the graphics processing pipeline stages.

FIG. 3 shows the job controller 25 and the stages of the graphics processing pipeline that are carried out by a rendering processor 12. The stages carried out by the rendering processor 12 are executed after the tiling unit 21 of the graphics processor 3 has prepared the required primitive lists.

Once the tiling unit 21 has completed the preparation of the primitive lists (lists of primitives to be processed for respective regions of the render output), then a tile of the render output can be rendered with reference to its associated primitive list(s).

To do this, respective tiles are processed by the graphics processing pipeline stages shown in FIG. 3. A respective tile may be processed as an individual (whole) tile or as plural sub-tiles that are each processed by the graphics processing pipeline stages separately and then combined.

The region allocator (or "fragment task iterator") 24 allocates regions to the rendering processor 12 for processing by the graphics processing pipeline 100.

The region allocator 24 may thus schedule the rendering processors 12, 13, 14, 15 to generate a render output, which may, e.g. be a frame to display, by the tiles being processed by the graphics processing pipeline stages of the rendering processors 12, 13, 14, 15.

When the rendering processor 12 is allocated a region to be processed, a fragment shader endpoint 110 of the rendering processor 12 identifies one or more tiles that the region corresponds to (e.g. at least partially intersects or is covered by).

For a given tile that all or part of is to be processed, a primitive list reader ('polygon list reader') 120 identifies a set of primitives to be processed for that tile based on the primitive lists (e.g. based on the primitives that are listed in a primitive list for that tile), and the set of primitives for the tile is then issued into the graphics processing pipeline 100 for processing.

A vertex loader 130 then loads in the vertices for the primitives, which are then passed into a primitive set-up unit (or 'triangle set-up unit') 140 that operates, inter alia, to determine, from the vertices for the primitives, edge information representing the primitive edges.

When it is determined that only part of a tile (a sub-tile) is to be processed (as opposed to the whole tile), before the primitives are passed to the rasteriser 150, primitives that will not contribute to (e.g. do not fall within) the sub-tile in question are in an embodiment discarded (culled). Primitives that will not contribute to the sub-tile can thereby be prevented from being passed to the rasteriser for rasterisation.

The primitives to be rasterised are then passed to the rasteriser 150, which rasterises the primitives into respective sets of one or more sampling points and generates for the primitives individual graphics fragments having appropriate positions (representing appropriate sampling positions) for rendering the primitives.

The fragments generated by the rasteriser 150 are then sent onwards to the rest of the pipeline for processing.

For instance, in the present embodiment, the fragments generated by the rasteriser 150 are subject to (early) depth (Z)/stencil testing 160, to see if any fragments can be discarded (culled) at this stage. To do this, the Z/stencil testing stage 160 compares the depth values of (associated with) fragments issuing from the rasteriser 150 with the depth values of fragments that have already been rendered (these depth values are stored in a depth (Z) buffer that is part of the tile buffer 22) to determine whether the new fragments will be occluded by fragments that have already been rendered (or not). At the same time, an early stencil test is carried out.

Fragments that pass the fragment early Z and stencil test stage 160 may then be passed to a fragment shading stage, in the form of a shader (execution/processing) core 170, for rendering.

The fragment shading stage 170 performs the appropriate fragment processing operations on the fragments that pass the early Z and stencil tests, so as to process the fragments to generate the appropriate rendered data.

This fragment processing may include any suitable and desired fragment shading processes, such as executing fragment shader programs for the fragments, applying textures to the fragments, applying fogging or other operations to the fragments, etc., to generate the appropriate rendered data.

In the present embodiment, the fragment shading stage is in the form of a shader pipeline (a programmable fragment shader), and thus is implemented by means of an appropriate shader (processing/execution) core 170.

Thus, in the present embodiment, the fragment shading stage (execution core) 170 includes a programmable execution unit (engine) operable to execute fragment shader programs for respective execution threads (where each thread corresponds to one work item, e.g. an individual fragment, for the output being generated) to perform the required fragment shading operations to thereby generate rendered data. The execution unit can operate in any suitable and desired manner in this regard and comprise any suitable and desired processing circuits, etc.

Once the fragment shading is complete, the output rendered (shaded) fragment data is written to the tile buffer 22 from where it can be written out 180 to, for example, the frame buffer 23 (e.g. in the memory 16) for display. The depth value for an output fragment is also written appropriately to a Z-buffer within the tile buffer 22. (The tile buffer stores colour and depth buffers that store an appropriate colour, etc., or Z-value, respectively, for each sampling point that the buffers represent (in essence for each sampling point of a rendering tile that is being processed).) These buffers store an array of fragment data that represents part of the overall output (e.g. image to be displayed), with respective sets of sample values in the buffers corresponding to respective pixels of the overall output (e.g. each 2×2 set of sample values may correspond to an output pixel, where 4× multisampling is being used).

When a region allocated to the rendering processor 12 corresponds to all or part of more than one tile, the next tile for the region is then identified by the fragment shader endpoint 110 and is processed in the manner described above, and so on, until the processing of the region allocated to the rendering processor has been completed.

Once sufficient tiles have been processed to generate the entire render output (e.g. frame (image) to be displayed), the process can then repeated for the next render output (e.g. frame) and so on.

For a render output that the graphics processor 3 generates, the graphics processor will, in accordance with embodiments of the technology described herein, track the processing carried out to generate the render output. This tracking is used to control the allocation of regions of the render output by the region allocator 24, so that the allocation of the regions to the rendering processors 12, 13, 14, 15 can more evenly distribute the processing to be carried out for the generation of the render output between the respective rendering processors 12, 13, 14, 15. This operation of the graphics processor 3 will now be described in more detail.

Figure 4:
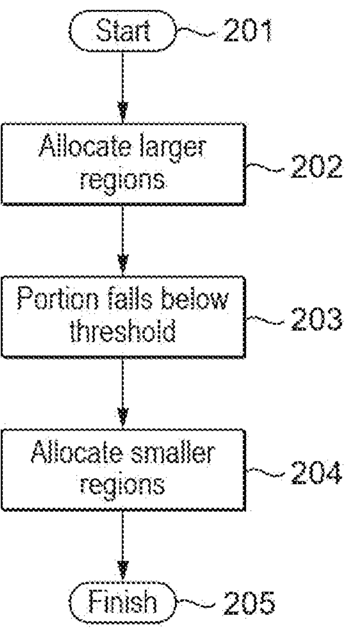
FIG. 4 illustrates schematically a method of allocating regions of a render output to rendering processors for processing in accordance with embodiments of the technology described herein.

FIG. 4 shows the relevant operation of the graphics processor 3 when allocating regions of a render output for processing in accordance with embodiments of the technology described herein.

The operation shown in FIG. 4 begins when regions for a new render output are to be allocated (step 201). Initially, the region allocator 24 of the graphics processor 3 allocates respective larger regions of the render output to respective ones of the rendering processors 12, 13, 14 and 15 for processing (step 202). The processing of the render output is tracked and it is determined when a portion of the render output that is still to be allocated to the rendering processors for processing falls below a threshold (step 203). In this regard, as more larger regions are allocated to rendering processors the portion of the render output that is still to be allocated to the rendering processors will decrease and, by tracking the processing of the render output (e.g. based on tracking the allocation itself), the rendering processor 3 is configured to determine when the portion of the render output that is still to be allocated to the rendering processors for processing is below the threshold.

When it is determined that the portion of the render output that is still to be allocated to the rendering processors 12, 13, 14 and 15 for processing falls below the threshold, to allocate regions of the remaining portion of the render output that is still to be allocated, the region allocator thereafter allocates smaller regions of the render output (regions that are relatively smaller than the larger regions of the render output allocated previously) to the rendering processors 12, 13, 14 and 15 for processing (step 204). Once regions for the entirety of the render output have been allocated, the allocation of the render output is then complete (step 205).

Figure 5:
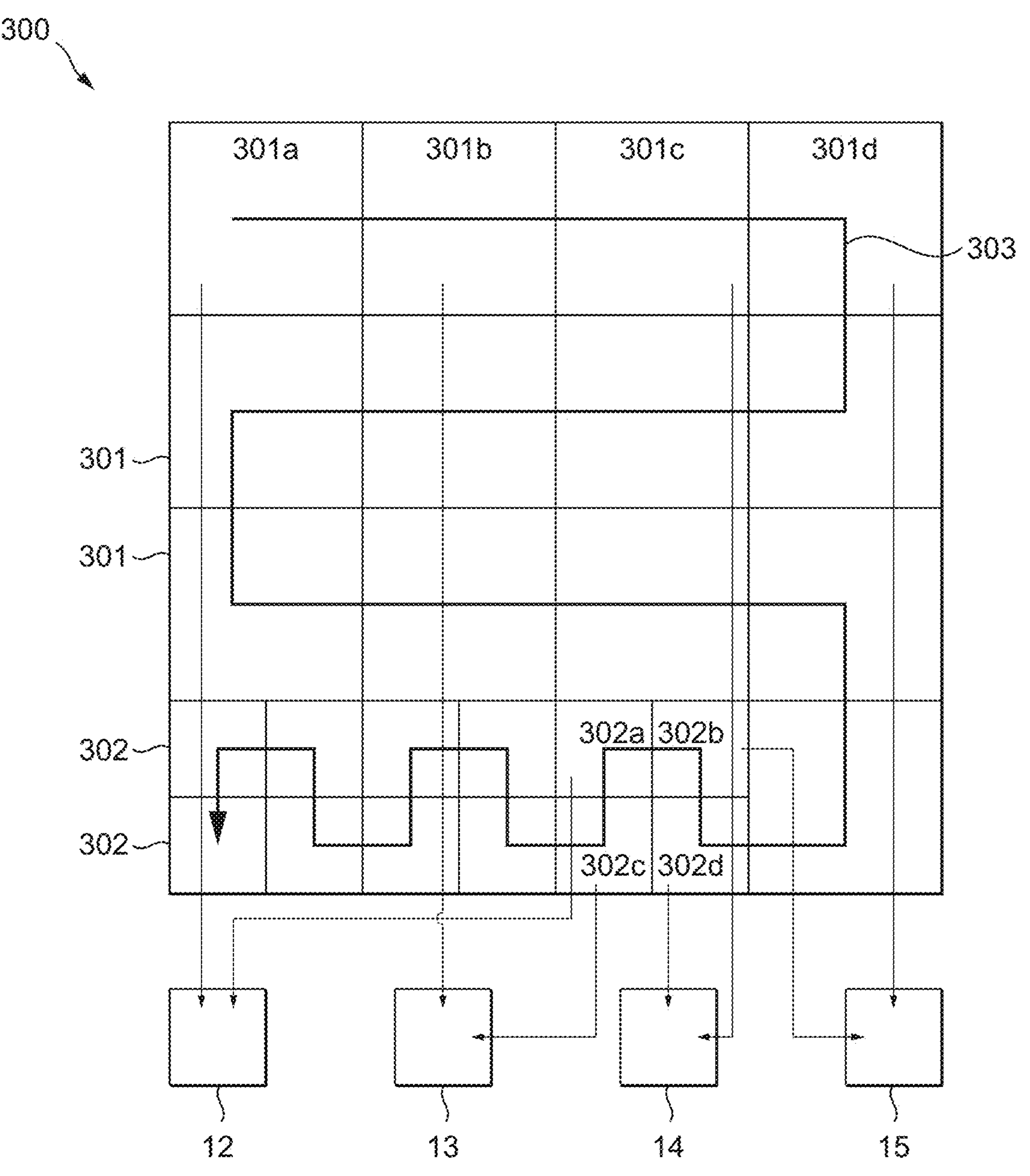
FIG. 5 illustrates schematically the allocation of regions of a render output to rendering processors for processing in accordance with an embodiment of the technology described herein.

FIG. 5 shows an example of a render output 300 for which larger regions 301 and smaller regions 302 are allocated to rendering processors 12, 13, 14, and 15 of the graphics processor 3 for processing in accordance with an embodiment of the technology described herein.

As shown in FIG. 5, region 301*a* is allocated to rendering processor 12, region 301*b* is allocated to rendering processor 13, region 301*c* is allocated to rendering processor 14, and region 301*d* is allocated to rendering processor 15. Regions 301 of the render output then continue to be allocated to the rendering processors 12, 13, 14 and 15 for processing in a raster path 303, where the next region to be allocated is allocated to an appropriate rendering processor (e.g. the next rendering processor that becomes available once it has finished processing a previous region of the render output 300). However, when the number of (larger) regions 301 remaining to be allocated to the rendering processors 12, 13, 14 and 15 falls below a threshold that, in the present embodiment, corresponds to a threshold size of 4 larger regions 301, smaller regions 302 of the render output are thereafter allocated to the rendering processors 12, 13, 14 and 15 for processing.

In the present embodiment, this is performed by smaller region 302*d* being allocated to rendering processor 14, smaller region 302*b* being allocated to rendering processor 15, smaller region 302*a* being allocated to rendering processor 12 and smaller region 302*c* being allocated to rendering processor 13. Smaller regions 302 can then continue to be allocated to the rendering processors 12, 13, 14 and 15 for processing as and when a rendering processor becomes available, until all of the regions of the render output have been allocated to the rendering processors 12, 13, 14 and 15 for processing.

Although one exemplary raster path (order) is used for allocation in the present embodiment, it will be appreciated that any other ordering of the regions 301 and 302 for allocation may be used. It will also be appreciated that although, in the present embodiment, successive regions 302*a*-302*d* are each processed by a different rendering processor, a rendering processor may, when appropriate, process consecutive allocated regions (whether they be larger 301 or smaller regions 302) despite the regions being allocated separate to one another. For example, this may occur should the last rendering processor to be allocated a region become the next rendering processor available for processing another region.

As discussed above with reference to FIG. 2, the graphics processor 3 can allocate regions of a render output by the region allocator 24 issuing rendering tasks to the rendering processors 12, 13, 14 and 15 for processing.

In the present embodiment, the render output 300 is processed by the entirety of the render output 300 being divided into larger regions 301 and a rendering task being generated for each of the larger regions 301. When smaller regions 302 of the render output are to be allocated, this is carried out by dividing an appropriate larger region 301 into a plurality of sub-regions that are allocated separately to one another, such that the allocated smaller regions 302 are sub-regions of a larger region 301.

A larger region 301 may be divided into any appropriate number of sub-regions. However, in the present embodiment, smaller regions 302 are allocated by dividing a larger region 301 into four equal sized (2×2) sub-regions that are allocated separately to one another. For example, with continued reference to FIG. 5, smaller regions 302*a*-302*d* are sub-regions of larger region 301*x*. In an embodiment, each larger region may correspond to 64×64 pixels and each sub-region may correspond to 32×32 pixels. However, other arrangements and configurations of the regions would, of course, be possible.

The graphics processor 3 in an embodiment allocates regions 301 and 302 by issuing a rendering task to a rendering processor together with a sub-region indication that indicates which sub-region(s) 302 of the region 301 that the rendering task corresponds to the rendering processor is allocated to process. This is described further with reference to FIGS. 7 and 8.

Figure 6:
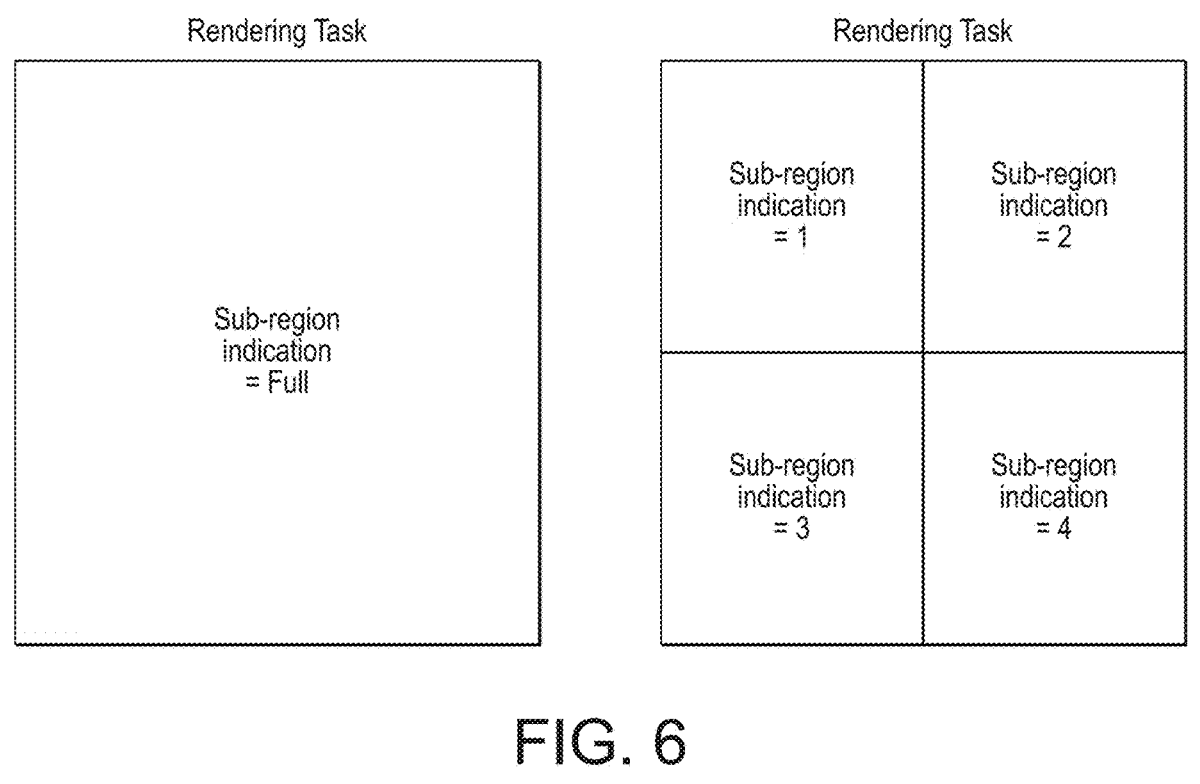

FIG. 6 shows how, in accordance with an embodiment, a sub-region indication can indicate which sub-region(s) 302 of a region 301 a rendering processor is allocated to process when the rendering processor is issued a rendering task corresponding to the region 301.

When the region allocator 24 issues a rendering task to a respective rendering processor for processing, the region allocator 24 additionally issues the rendering processor with a sub-region indication. The sub-region indication indicates which sub-region(s) 302 of a region 301 are to be processed by a rendering processor when processing a rendering task corresponding to that region 301.

In the embodiment shown in FIG. 6, the sub-region indication comprises firstly a “full” (or “valid”) flag that can be set to indicate that the entire (larger) region 301 is to be processed by the rendering processor, together with an appropriate two bit code that can be set to the appropriate value to indicate a different particular sub-region to be processed that will be used and interpreted when the “full” indicator is not set.

Other arrangements, such as the use of a bit mask with entries corresponding to each respective sub-region that can accordingly be set to indicate whether that sub-region is to be rendered or not could instead be used, if desired.

In this manner, when an entire (larger) region 301 is to be allocated to a rendering processor, the corresponding rendering task for that region 301 need only be issued once. However, when a region 301 is to be allocated as a plurality of sub-regions 302 then the same corresponding rendering task for that region 301 can be issued plural times with different sub-region indications.

Figure 7:
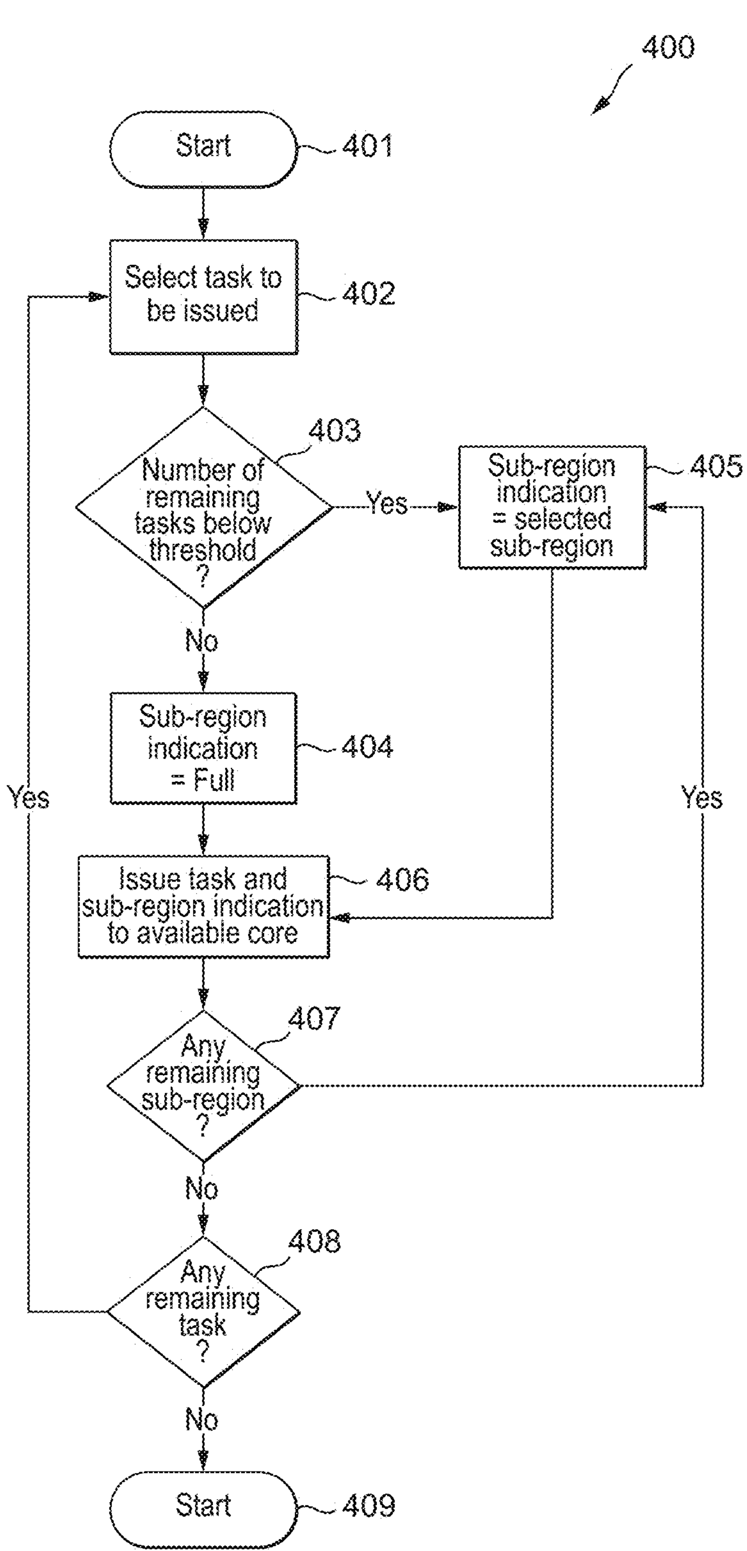
FIG. 7 illustrates schematically a method of issuing rendering tasks to process a render output in accordance with embodiments of the technology described herein.

FIG. 7 shows the operation of the region allocator 24 for issuing rendering tasks to process render output 300 in accordance with embodiments of the technology described herein.

As shown in FIG. 7, when render output 300 is to be generated (step 401), a rendering task corresponding to a region 301 of the render output 300 is selected to be allocated (issued) to a rendering processor (step 402). To do this, a list of rendering tasks corresponding to respective regions 301 of the render output 300 is prepared by job controller 25 and the next rendering task to be allocated by task allocator 24 is selected based on an allocation order for the rendering tasks.

The allocation of rendering tasks is controlled based on whether a portion of the render output 300 that is still to be allocated to the rendering processors falls below a threshold. In the present embodiment, this is performed by determining whether the number of rendering tasks for the regions 301 of the render output 300 that are still to be allocated to the rendering processors 12, 13, 14 and 15 falls below a threshold number of rendering tasks (corresponding to a threshold number of regions 301) (step 403). To do this, the region allocator 24 counts the number of rendering tasks in the list of rendering tasks for the render output 300 and the number of rendering tasks that it has (already) allocated to the rendering processors 12, 13, 14 and 15 for processing. The number of rendering tasks that are still to be allocated can then be determined based on a difference between the number of rendering tasks for the render output 300 and the number of rendering tasks that have been allocated to the rendering processors 12, 13, 14 and 15 for processing. When the same rendering task is to be allocated to the rendering processors 12, 13, 14 and 15 multiple times for different sub-regions 302, for the purposes of the tracking that rendering task is counted as one rendering task that has been allocated once it has been issued for all of its sub-regions 302.

To control whether a rendering processor processes an (entire) region 301 or particular sub-region(s) 302 when processing a rendering task, the region allocator 24 issues respective sub-region indications for respective rendering tasks that it allocates.

When it is determined that the number of rendering tasks still to be allocated to the rendering processors 12, 13, 14 and 15 does not fall below the threshold, the sub-region indication for a rendering task is selected to indicate that it is the entire region 301 corresponding to rendering task that is to be processed (step 404).

However, when it is determined that the number of rendering tasks still to be allocated to the rendering processors 12, 13, 14 and 15 falls below the threshold, the sub-region indication for a rendering task is selected to indicate particular sub-region(s) 302 to be processed that the region 301 corresponding to the rendering task is divided into for allocation to a rendering processor 12, 13, 14, 15 (step 405). The sub-region(s) 302 that the rendering task is selected to indicate may be based on any suitable allocation order.

When a rendering task and sub-region indication have been issued to a rendering processor for processing (step 406), the region allocator 24 determines whether the region 301 that the rendering task corresponds to has any outstanding sub-regions 302 that are still to be allocated to a rendering processor for processing (step 407).

When there are outstanding sub-regions 302 for the region 301 that are still to be allocated, the rendering task for the region 301 is issued again to a rendering processor for processing and the sub-region indication issued with the (re-issued) rendering task is selected to indicate a remaining sub-region 302 (or sub-regions) for the region 301.

When there are no remaining sub-regions 302 for the region 301 that are still to be allocated (i.e. when all of the sub-regions 302 have been selected for processing in one or more of the issued sub-region indications for the rendering task for the region 301), the allocation of the rendering task is complete and the region allocator 24 determines whether there are any outstanding rendering tasks to be allocated for the render output 300 (step 408) and the process can be repeated for any outstanding rendering task. When there are no outstanding rendering tasks to be allocated (i.e. when all of the regions 301 to be processed for the render output 300 have been allocated in rendering tasks), the allocation process for the rendering output 300 has been completed (step 409) and the region allocator can, for example, begin allocation of rendering tasks for a next render output.

Figure 8:
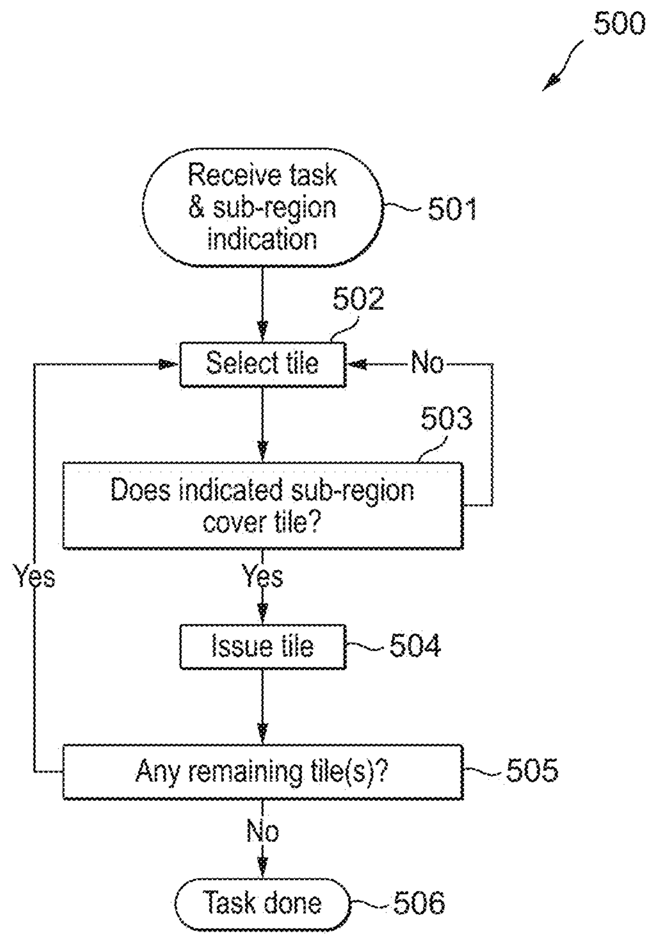
FIG. 8 illustrates schematically a method of issuing rendering tile(s) to process a rendering task in accordance with embodiments of the technology described herein.

FIG. 8 shows the operation 500 of a rendering processor 12, 13, 14, 15 for issuing rendering tile(s) to its resources to process a rendering task in accordance with embodiments of the technology described herein.

When the rendering processor 12, 13, 14, 15 receives a rendering task and sub-region indication (step 501) for the processing of a render output 300, the rendering processor 12, 13, 14, 15 uses the sub-region indication to determine which tile(s) that the render output 300 is divided into are covered by the sub-region(s) 302 that the sub-region indication indicates that the rendering processor 12, 13, 14, 15 is to process. When a tile is covered by one or more sub-regions that the sub-region indication indicates the rendering processor is to process, the tile is issued for processing.

Accordingly, the rendering processor 12, 13, 14, 15 determines which tile(s) to issue for processing by selecting a tile that the render output 300 is divided into for processing (step 502) and determining whether a sub-region indicated to be processed by the sub-region indication and associated rendering task covers the selected tile (step 503).

When it is determined that the selected tile is covered by a sub-region 302 indicated to be processed by the sub-region indication, the tile is issued to a processing pipeline of the rendering processor 12, 13, 14, 15 for processing (step 504). When it is determined that the selected tile is not covered by a sub-region 302 indicated to be processed by the sub-region indication, the selected tile is not issued to be processed to process the received rendering task.

When it is determined that there are remaining tiles to be processed to process the received rendering task (step 505), steps 502 and 503 are repeated by selecting a next tile and determining whether the next selected tile is covered by a sub-region 302 indicated to be processed by the sub-region indication. This may be carried out until a next tile is issued for processing (repeating step 504 for the next tile), upon which step 505 can then be repeated to determine if there are (further) remaining tiles to be processed.

Steps 502-505 can then continue to be repeated as appropriate, until it is determined that all of the tile(s) to process the sub-region(s) indicated to be processed by the sub-region indication to process the rendering task have been issued for processing, at which point the operation of issuing tiles(s) to process for the rendering task and sub-region indication in question is completed (step 506).

The rendering processor may then begin the operation 500 for a next rendering task and sub-region indication that it has received, as appropriate.

Tile(s) may be selected for determining whether they are covered by a sub-region 302 in any suitable order, based for example on some indication of which tiles have positions within the render output that are most likely to be covered by the particular region 301 that a rendering task corresponds and/or a particular sub-region 302 of that region 301. In embodiments where there is a direct known correspondence between particular tile(s) and sub-regions, the tile(s) known or determined to correspond to a particular sub-region may be issued without requiring other tile(s) to be selected for determination.

As discussed above, sub-regions 302 that regions 301 are divided into for allocation purposes may correspond to (cover) whole tile(s) or may correspond to (cover) only part of a tile (be a "sub-tile"). When a sub-region 302 corresponds to only particular sub-tile(s), the sub-region may be processed by processing the entire tile(s) that comprise the sub-tile(s) being processed. However, in an embodiment, the rendering processors 12, 13, 14 and 15 are operable to process a sub-tile region without being required to perform all of the processing that would be required to process an entire tile. A manner of processing only particular sub-tiles in accordance with an embodiment of the technology described herein is discussed below in connection with FIG. 9 and FIG. 10.

Figure 9:
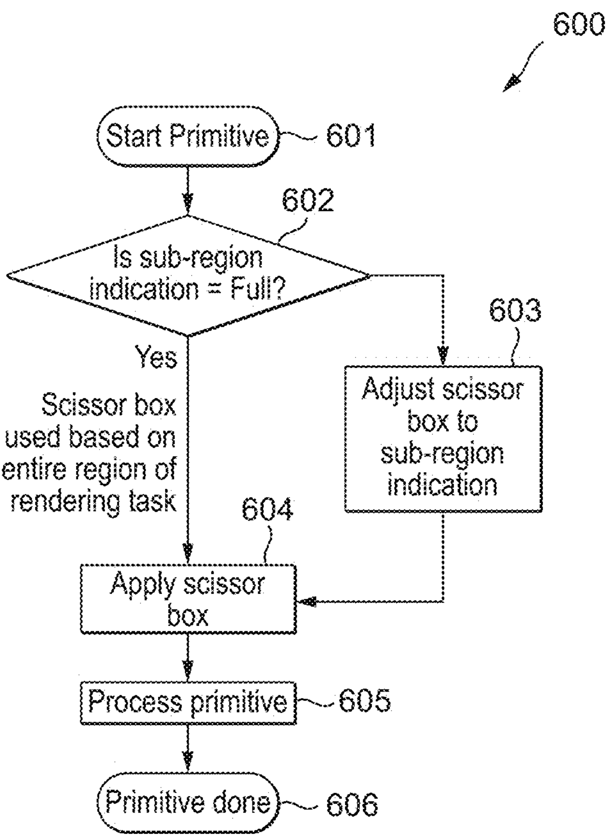
FIG. 9 illustrates schematically a method of selectively processing the primitives for a sub-region of a tile in accordance with embodiments of the technology described herein.

FIG. 9 shows the operation 600 of a rendering processor 12, 13, 14, 15 in accordance with embodiments of the technology described herein when processing primitives for a tile issued for processing in response to a rendering task and sub-region indication.

In this operation 600 of the rendering processor, when a tile is issued for processing by a rendering processor, the rendering processor can determine which primitives for the tile to rasterise for the processing required by the rendering task and sub-region indication in question. This may be carried out by a primitive list reader of the rendering processor reading primitive list(s) to determine the primitives for the tile, the primitive list reader providing the primitives for the tile to a triangle setup unit of the rendering processor, and the triangle setup unit of the rendering processor determining which primitives for the tile should be rasterised to process the sub-region(s) indicated to be processed by the sub-region indication (which may only cover a particular sub-tile region of the tile).

With continued reference to FIG. 9, when a tile is issued for processing by a rendering processor in response to a rendering task and sub-region indication, and a primitive for the issued tile is provided (step 601), and it is to be determined whether the primitive is to be rasterised, the rendering processor determines whether the sub-region indication indicates that the entire region 301 that the rendering task corresponds to is to be processed by the rendering processor (step 602).

When the sub-region indication indicates that the entire region 301 is to be processed, a scissor box (bounding box) is selected for determining whether the primitive for the tile falls within the region 301 that the rendering task corresponds to. However, when the sub-region indication indicates that one or more sub-regions 302 are to be processed (rather than the entire region 301), a scissor box (bounding box) is selected for determining whether the primitive for the tile falls within the one or more sub-regions 302 indicated by the sub-region indication (step 603).

The scissor box is then applied (step 604) to determine whether the primitive should be rasterised for the processing required by the rendering task and sub-region indication, based on whether or not the primitive falls within the scissor box.

The primitive can then be processed (step 605) according to the determination, where if the primitive falls within the scissor box it is rasterised for generating fragments for rendering and if the primitive does not fall within the scissor box it is culled.

The processing of the primitive in question can thereby be completed (step 606) and the operation 600 can be repeated for another primitive, and so on, until all of the primitives for the tile have been processed.

FIG. 9 shows the determination of whether the sub-region indication indicates that the entire region 301 that the rendering task corresponds to is to be processed (step 602) is carried out for a primitive to process. However, while this may be carried out for each primitive individually, it may otherwise be carried out for groups of primitives together. For example, the determination may be carried out for a tile being processed and the scissor box selected for use then being applied for all primitives of the tile rather than determining the appropriate scissor box to apply for each primitive individually.

A rendering processor may be operable to selectively process any indicated sub-tile portion by selecting an appropriate scissor box. However, in embodiments, the regions 301 and sub-regions 302 may be configured such that tiles are only operable to be divided in some predetermined way, such as into quadrants. For example, regions 301 may be selected to comprise whole tile(s) and sub-regions may be selected to each comprise some number (e.g. individual) quadrants of a tile. In this case a scissor box can be selected to correspond to the appropriate quadrant(s) of a tile when a sub-region 302 is to be processed and to the entire tile when a region 301 is to be processed.

Using a scissor box to selectively rasterise particular primitives can thereby allow a sub-tile region of the tile to be processed (the portion of the tile covered by the scissor box) rather than processing the entire tile.

Selectively rasterising particular primitives from the primitives provided for a tile can allow a sub-tile to be selectively rendered by the remaining stages of a tile-based graphics processing pipeline, without necessarily requiring any of those remaining stages to be modified according to whether an entire tile or sub-tile is to be rendered.

As rendered data for a sub-tile is generated by rendering fragments, the rendered data is stored in a tile buffer for storing the rendered data for a tile. Once the rendered data for the sub-tile is generated, the data may be output from the tile buffer by outputting all of the data from the tile buffer in the same manner as would be performed for an entire tile. However, in embodiments, the write out of data from the tile buffer can be controlled depending on whether the rendered data is for a tile or a sub-tile. An exemplary manner of controlling this is described further with reference to FIG. 10.

Figure 10:
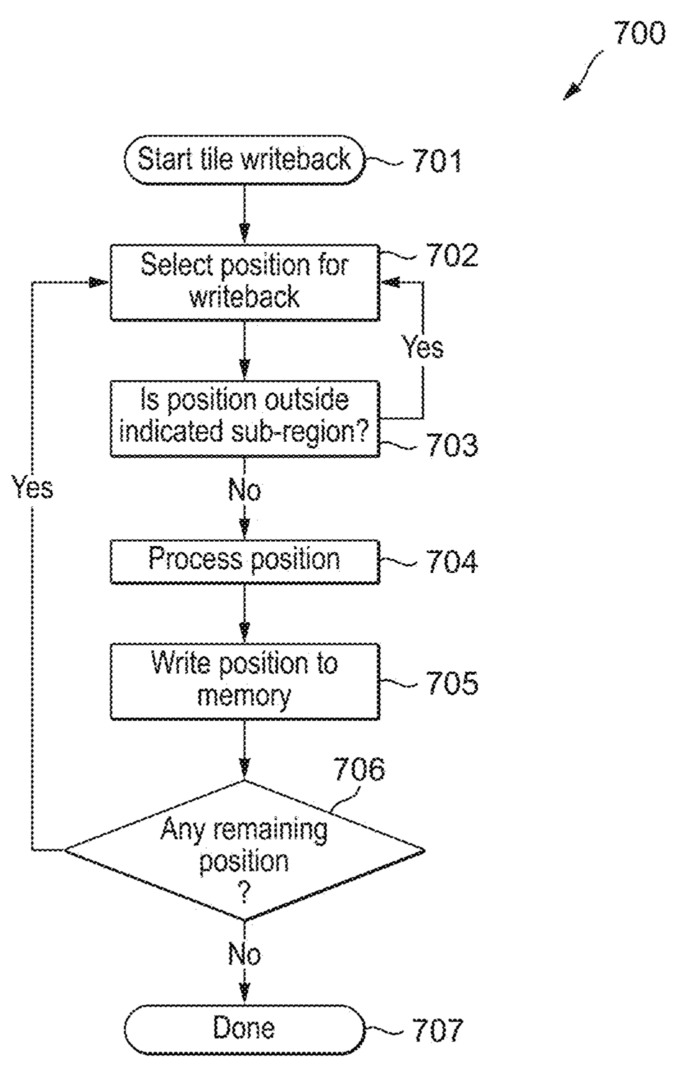
FIG. 10 illustrates schematically a method of selectively writing out the rendered data for a sub-region of a tile from a tile buffer in accordance with embodiments of the technology described herein.

FIG. 10 shows an operation 700 for controlling data written out of a tile buffer in accordance with an embodiment of the technology described herein.

In this embodiment, the tile buffer is operable to store data representative of a tile of the render output as a data array with positions in the data array corresponding to (sampling) positions in the tile. Each position of the data array may have a one-to-mapping to a particular pixel of the final render output but this is not essential, for example down-scaling or up-scaling may occur as the data is written out of the tile buffer. Each position in the data array may store, for example, colour and depth values based on the rendering of fragment(s) for that position.

When data for a sub-tile (but not an entire tile) is being generated and written to the tile buffer, the rendered data for the sub-tile is stored with positions in a data array corresponding to the positions occupied by the sub-tile. Remaining positions of the data array that would be operable for storing data for areas of the tile outside of the rendered sub-tile may, for example, be "empty" or store previously generated data values that are not valid for the sub-tile in question.

When writeback from the tile buffer to memory is triggered (step 701) while executing a rendering task, a position within the data array stored in the tile buffer is selected (step 702) and it is determined whether the position in the data array corresponds to a position in the tile that falls within a region 301 or sub-region 302 indicated to be processed by the rendering task and the associated sub-region indication (step 703).

When the position is outside of the indicated region 301 or sub-region then another position in the data array is selected without writing out the data for the position in question. When the position in the data array corresponds to a position in the render output within the indicated region 301 or sub-region 302 then the data for that position is written out to memory (step 705), in an embodiment after other processing of that data position (step 704) such as to up-sample or down-sample the data.

It is then determined whether there are remaining positions of the data array to be written out (step 706) and, when there are remaining positions, then a next position can be selected and the process repeated as appropriate, until it is determined that all of the required positions of the data array have been written out.

When all of the required data positions have been written out then the write out of the data in the tile buffer is complete (step 707) and rendered data for another tile may, for example, begin to be written to the tile buffer as it is generated.

Selectively writing out data for particular positions in this manner can be used to control whether an entire tile or sub-tile is written out to memory. However, the operation 700 may in an embodiment only be used for controlling which positions for a sub-tile are written to memory, and when it is determined that an entire tile is to be written out then, for example, all of data positions may be written out without individually determining whether to write out each position. This may be implemented by, for example, enabling or disabling the operation 700 as appropriate based on whether the entire tile or a sub-tile is required for the rendering task and sub-region indication being executed.

It can be seen from the above that the technology described herein, in its embodiments at least, can provide more efficient distribution of processing between rendering processors when performing tile-based graphics processing. This is achieved in the embodiments of the technology described herein at least, by tracking the processing of a render output to determine when a portion of the render output that is still to be allocated to the rendering processors for processing falls below a threshold and controlling the size of regions of the render output that are allocated to the rendering processors based on this tracking.

Although embodiments of the technology described herein have been described relating to performing graphics processing to render a render output, the technology described herein is also applicable more generally to processing a data array by allocating different regions of the data array to different processing circuits for processing, where the processing of the data array is tracked to determine when a portion of the data array that is still to be allocated to the processing circuits for processing falls below a threshold, and the size of regions of the data array that are allocated to the processing circuits for processing is controlled based on this tracking.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a tile-based graphics processor that comprises plural rendering processors each operable to render rendering tiles that a render output is divided into for rendering purposes, the method comprising:

when rendering a render output:

allocating regions of the render output to the rendering processors for processing; and each rendering processor processing the region or regions allocated to it to generate rendered data for the region or regions;

the method further comprising:

tracking the processing of the render output to determine when a portion of the render output that is still to be allocated to the rendering processors for processing falls below a threshold; and when it is determined that a portion of the render output that is still to be allocated to the rendering processors for processing falls below the threshold:

thereafter allocating smaller regions of the render output to the rendering processors for processing, wherein allocating smaller regions of the render output to the rendering processors for processing comprises subdividing one or more of the tiles of the render output each into a plurality of sub-tile regions, and allocating the sub-tile regions to the rendering processors separately to each other for processing, and wherein the method comprises, when a sub-tile region of a tile is allocated to a rendering processor for processing, the rendering processor:

providing a set of primitives for the tile;

determining whether primitives in the set of primitives for the tile fall within the sub-tile region;

generating graphics fragments for the sub-tile region using primitives determined to fall within the sub-tile region; and processing the graphics fragments generated for the sub-tile region to generate rendered data for the sub-tile region.

2. The method of claim 1, comprising:

initially allocating tiles of the render output to the rendering processors for processing; and when it is determined that a portion of the render output that is still to be allocated to the rendering processors for processing falls below the threshold:

thereafter sub-dividing any tile still to be allocated to a rendering processor for processing into a plurality of sub-tile regions, and allocating the sub-tile regions to the rendering processors separately to each other for processing.

3. The method of claim 1, wherein the rendering processor determines whether primitives in the set of primitives for the tile fall within the sub-tile region based on edge information representing edges of the primitives and information representing the boundaries of the sub-tile region.

4. The method of claim 1, comprising:

generating a set of rendering tasks for processing the render output, wherein rendering tasks in the set of rendering tasks correspond to regions of the render output, and wherein the rendering processors are operable to process regions of the render output by processing the respective rendering tasks corresponding to the respective regions;

allocating regions of the render output to the rendering processors for processing by issuing rendering tasks to the rendering processors for processing; and when it is determined that the portion of the render output that is still to be allocated to the rendering processors for processing falls below the threshold;

sub-dividing a region that a rendering task in the set of rendering tasks corresponds to and that is still to be allocated to a rendering processor for processing into a plurality of sub-regions, and allocating the sub-regions to the rendering processors separately to each other for processing.

5. The method of claim 4, comprising:

allocating a sub-region to a rendering processor for processing by issuing to the rendering processor:

the rendering task that corresponds to the region that comprises the sub-region; and a sub-region indication indicating the sub-region within the region;

and the method further comprising:

the rendering processor processing said sub-region by controlling the processing it performs when processing the rendering task based on the sub-region indication.

6. The method of claim 5, comprising issuing a sub-region indication together with each rendering task issued to a rendering processor;

wherein, when the entire region that a rendering task corresponds to is allocated to a rendering processor for processing, the sub-region indication issued with that rendering tasks indicates that the rendering processor is allocated to process the entire region that the rendering task corresponds to when processing the rendering task.

7. The method of claim 1, wherein tracking the processing of the render output to determine when a portion of the render output that is still to be allocated to the rendering processors for processing falls below a threshold comprises:

tracking when the number of tiles of the render output that are still to be allocated to the rendering processors for processing falls below a threshold number of tiles.

8. The method of claim 1, comprising decreasing the size of regions of the render output that are allocated to the rendering processors for processing each time the portion of the render output that is still to be allocated to the rendering processors for processing falls below one of plural successive thresholds.

9. A tile-based graphics processor, comprising:

a plurality of rendering processors, each operable to render rendering tiles that a render output is divided into for rendering purposes; and a region allocation circuit configured to allocate regions of a render output to be processed to rendering processors for processing;

wherein the rendering processors are configured to process regions of a render output allocated to them by the region allocation circuit to generate rendered data for the regions;

and wherein the region allocation circuit is configured to:

track the processing of a render output to determine when a portion of the render output that is still to be allocated to the rendering processors for processing falls below a threshold; and when it is determined that a portion of a render output that is still to be allocated to the rendering processors for processing falls below the threshold, thereafter allocate smaller regions of the render output to the rendering processors for processing, wherein the region allocation circuit is configured to allocate the smaller regions of the render output to the rendering processors for processing by sub-dividing one or more of the tiles of the render output each into a plurality of sub-tile regions, and allocating the sub-tile regions to the rendering processors separately to each other for processing, and wherein the rendering processors are configured to, when allocated a sub-tile region of a tile for processing, process the sub-tile region by:

providing a set of primitives for the tile;

determining whether primitives in the set of primitives for the tile fall within the sub-tile region;

generating graphics fragments for the sub-tile region using primitives determined to fall within the sub-tile region; and processing the graphics fragments generated for the sub-tile region to generate rendered data for the sub-tile region.

10. The graphics processor of claim 9, wherein the region allocation circuit is configured to:

initially allocate tiles of the render output to the rendering processors for processing; and when it is determined that the portion of the render output that is still to be allocated to the rendering processors for processing falls below the threshold:

thereafter sub-divide any tile still to be allocated to a rendering processor for processing into a plurality of sub-tile regions, and allocate the sub-tile regions to the rendering processors separately to each other for processing.

11. The graphics processor of claim 1, wherein the rendering processors are configured to, in response to being allocated a sub-tile region of a tile for processing, determine whether primitives in the set of primitives for the tile fall within the sub-tile region based on edge information representing edges of the primitives and information representing the boundaries of the sub-tile region.

12. The graphics processor of claim 9, comprising:

a rendering task generating circuit configured to generate a set of rendering tasks for processing a render output, wherein rendering tasks in the set of rendering tasks correspond to regions of the render output, and wherein the rendering processors are operable to process regions of the render output by processing the respective rendering tasks corresponding to the respective regions;

wherein the region allocation circuit is configured to:

allocate regions of the render output to the rendering processors for processing by issuing rendering tasks to the rendering processors for processing; and when it is determined that the portion of the render output that is still to be allocated to the rendering processors for processing falls below the threshold;

sub-divide a region that a rendering task in the set of rendering tasks corresponds to and that is still to be allocated to a rendering processor for processing into a plurality of sub-regions, and allocate the sub-regions to the rendering processors separately to each other for processing.

13. The graphics processor of claim 12, wherein the region allocation circuit is configured to allocate a sub-region to a rendering processor for processing by issuing to the rendering processor:

the rendering task that corresponds to the region that comprises the sub-region; and a sub-region indication indicating the sub-region within the region;

and wherein the rendering processors are configured to, when allocated a sub-region for processing, process said sub-region by processing the rendering task and using the sub-region indication to control the processing performed when processing the rendering task.

14. The graphics processor of claim 13, wherein the region allocation circuit is configured to issue a sub-region indication together with each rendering task issued to a rendering processor;

wherein the region allocation circuit is configured to allocate an entire region that a rendering task corresponds to to a rendering processor for processing by issuing the rendering task and a sub-region indication that indicates that the rendering processor is allocated to process the entire region that the rendering task corresponds to when processing the rendering task.

15. The graphics processor of claim 9, wherein the region allocation circuit is configured to track the processing of a render output to determine when a portion of the render output that is still to be allocated to the rendering processors for processing falls below a threshold by:

tracking when the number of tiles of the render output that are still to be allocated to the rendering processors for processing falls below a threshold number of tiles.

16. The graphics processor of claim 9, wherein the region allocation circuit is configured to decrease the size of regions of the render output that are allocated to the rendering processors for processing each time the portion of the render output that is still to be allocated to the rendering processors for processing falls below one of plural successive thresholds.

17. A non-transitory computer readable storage medium storing computer software code which when executing on one or more processors performs a method of operating a tile-based graphics processor that comprises plural rendering processors each operable to render rendering tiles that a render output is divided into for rendering purposes, the method comprising:

when rendering a render output:

allocating regions of the render output to the rendering processors for processing; and each rendering processor processing the region or regions allocated to it to generate rendered data for the region or regions;

the method further comprising:

tracking the processing of the render output to determine when a portion of the render output that is still to be allocated to the rendering processors for processing falls below a threshold; and when it is determined that a portion of the render output that is still to be allocated to the rendering processors for processing falls below the threshold:

thereafter allocating smaller regions of the render output to the rendering processors for processing, wherein allocating smaller regions of the render output to the rendering processors for processing comprises sub-dividing one or more of the tiles of the render output each into a plurality of sub-tile regions, and allocating the sub-tile regions to the rendering processors separately to each other for processing, and wherein the method comprises, when a sub-tile region of a tile is allocated to a rendering processor for processing, the rendering processor;

providing a set of primitives for the tile;

determining whether primitives in the set of primitives for the tile fall within the sub-tile region;

generating graphics fragments for the sub-tile region using primitives determined to fall within the sub-tile region; and processing the graphics fragments generated for the sub-tile region to generate rendered data for the sub-tile region.

* * * * *